United States Patent
Yalla et al.

(10) Patent No.: US 10,423,162 B2
(45) Date of Patent: Sep. 24, 2019

(54) AUTONOMOUS VEHICLE LOGIC TO IDENTIFY PERMISSIONED PARKING RELATIVE TO MULTIPLE CLASSES OF RESTRICTED PARKING

(71) Applicant: NIO USA, Inc., San Jose, CA (US)

(72) Inventors: Veera Ganesh Yalla, Sunnyvale, CA (US); Davide Bacchet, Campbell, CA (US)

(73) Assignee: NIO USA, Inc., San Jose, CA (US)

( * ) Notice: Subject to any disclaimer, the term of this patent is extended or adjusted under 35 U.S.C. 154(b) by 50 days.

(21) Appl. No.: 15/589,840

(22) Filed: May 8, 2017

(65) Prior Publication Data
US 2018/0321685 A1    Nov. 8, 2018

(51) Int. Cl.
*G05D 1/02*    (2006.01)
*G08G 1/14*    (2006.01)
(Continued)

(52) U.S. Cl.
CPC ......... *G05D 1/0225* (2013.01); *G05D 1/0274* (2013.01); *G05D 1/0276* (2013.01);
(Continued)

(58) Field of Classification Search
CPC .. G05D 1/0225; G05D 1/0274; G05D 1/0276; G07B 15/02; G07C 9/00126; G07C 9/00166; G08G 1/149
See application file for complete search history.

(56) References Cited

U.S. PATENT DOCUMENTS

| | | |
|---|---|---|
| 3,790,277 A | 2/1974 | Hogan |
| 4,154,529 A | 5/1979 | Dyott |
| (Continued) | | |

FOREIGN PATENT DOCUMENTS

| | | |
|---|---|---|
| EP | 2410358 | 1/2012 |
| EP | 2524843 | 11/2012 |
| | (Continued) | |

OTHER PUBLICATIONS

Combining 3D Shape, Color, and Motion for Robust Anytime Tracking; Held, David, Levinson, Jesse, Thrun, Sebastian, Savarese, Silvio, Robotics: Science and Systems (RSS), Berkeley, California, USA (2014).

(Continued)

*Primary Examiner* — Calvin Cheung
(74) *Attorney, Agent, or Firm* — Sheridan Ross P.C.

(57) ABSTRACT

Various embodiments relate generally to autonomous vehicles and associated mechanical, electrical and electronic hardware, computing software, including autonomy applications, image processing applications, cloud storage, cloud computing applications, etc., and computing systems, and wired and wireless network communications to facilitate autonomous control of vehicles, and, more specifically, to systems, devices, and methods configured to identify permissioned parking relative to multiple classes of restricted and privileged parking. In some examples, a method may include determining a parking area for an autonomous vehicle; based at least in part on the parking area, determining a parking place for the autonomous vehicle; determining a parking duration for the autonomous vehicle in the parking place; based at least in part on the parking duration, determining a classification of the parking place; and based at least in part on the classification, initiating a command to position the autonomous vehicle in the parking place.

20 Claims, 6 Drawing Sheets

(51) Int. Cl.
*G07C 9/00* (2006.01)
*G07B 15/02* (2011.01)
*G05D 1/00* (2006.01)

(52) U.S. Cl.
CPC ......... *G07B 15/02* (2013.01); *G07C 9/00126* (2013.01); *G07C 9/00166* (2013.01); *G08G 1/149* (2013.01); *G05D 1/0088* (2013.01)

(56) References Cited

U.S. PATENT DOCUMENTS

| | | |
|---|---|---|
| 4,361,202 A | 11/1982 | Minovitch |
| 4,516,158 A | 5/1985 | Grainge et al. |
| 4,700,301 A | 10/1987 | Dyke |
| 4,709,195 A | 11/1987 | Hellekson et al. |
| 5,098,185 A | 3/1992 | Watanabe et al. |
| 5,202,742 A | 4/1993 | Frank et al. |
| 5,220,507 A | 6/1993 | Kirson |
| 5,303,084 A | 4/1994 | Pflibsen et al. |
| 5,337,189 A | 8/1994 | Krawczyk et al. |
| 5,375,059 A | 12/1994 | Kyrtsos et al. |
| 5,390,125 A | 2/1995 | Sennott et al. |
| 5,428,438 A | 6/1995 | Komine |
| 5,438,517 A | 8/1995 | Sennott et al. |
| 5,548,516 A | 8/1996 | Gudat et al. |
| 5,555,503 A | 9/1996 | Kyrtsos et al. |
| 5,558,370 A | 9/1996 | Behr |
| 5,610,815 A | 3/1997 | Gudat et al. |
| 5,612,883 A | 3/1997 | Shaffer et al. |
| 5,615,116 A | 5/1997 | Gudat et al. |
| 5,629,855 A | 5/1997 | Kyrtsos et al. |
| 5,640,323 A | 6/1997 | Kleimenhagen et al. |
| 5,646,843 A | 7/1997 | Gudat et al. |
| 5,646,845 A | 7/1997 | Gudat et al. |
| 5,648,901 A | 7/1997 | Gudat et al. |
| 5,657,226 A | 8/1997 | Shin et al. |
| 5,680,306 A | 10/1997 | Shin et al. |
| 5,680,313 A | 10/1997 | Whittaker et al. |
| 5,684,696 A | 11/1997 | Rao et al. |
| 5,703,351 A | 12/1997 | Meyers |
| 5,838,562 A | 11/1998 | Gudat et al. |
| 5,956,250 A | 9/1999 | Gudat et al. |
| 5,959,552 A | 9/1999 | Cho |
| 6,046,800 A | 4/2000 | Ohtomo et al. |
| 6,115,128 A | 9/2000 | Vann |
| 6,122,572 A | 9/2000 | Yavnai |
| 6,151,539 A | 11/2000 | Bergholz et al. |
| 6,264,353 B1 | 7/2001 | Caraher et al. |
| 6,301,542 B1 | 10/2001 | Kirchberger et al. |
| 6,374,168 B1 | 4/2002 | Fujii |
| 6,438,472 B1 | 8/2002 | Tano et al. |
| 6,502,016 B1 | 12/2002 | Ozaki et al. |
| 6,626,463 B1 | 9/2003 | Arima et al. |
| 6,728,616 B1 | 4/2004 | Tabe |
| 6,749,218 B2 | 6/2004 | Breed |
| 6,752,508 B2 | 6/2004 | Kobayashi |
| 6,778,732 B1 | 8/2004 | Fermann |
| 7,036,128 B1 | 4/2006 | Julia et al. |
| 7,069,780 B2 | 7/2006 | Ander |
| 7,089,114 B1 | 8/2006 | Huang |
| 7,106,180 B1 | 9/2006 | Pompei |
| 7,164,117 B2 | 1/2007 | Breed et al. |
| 7,248,342 B1 | 7/2007 | Degnan |
| 7,255,275 B2 | 8/2007 | Gurevich et al. |
| 7,259,838 B2 | 8/2007 | Carlhoff et al. |
| 7,311,000 B2 | 12/2007 | Smith et al. |
| 7,361,948 B2 | 4/2008 | Hirano et al. |
| 7,417,716 B2 | 8/2008 | Nagasaka et al. |
| 7,426,429 B2 | 9/2008 | Tabe |
| 7,451,005 B2 | 11/2008 | Hoffberg et al. |
| 7,544,945 B2 | 6/2009 | Tan et al. |
| 7,663,502 B2 | 2/2010 | Breed |
| 7,865,277 B1 | 1/2011 | Larson et al. |
| 7,969,558 B2 | 6/2011 | Hall |
| 7,979,175 B2 | 7/2011 | Allard et al. |
| 8,050,863 B2 | 11/2011 | Trepagnier et al. |
| 8,123,642 B2 | 2/2012 | Ishikawa et al. |
| 8,126,642 B2 | 2/2012 | Trepaginer et al. |
| 8,346,480 B2 | 1/2013 | Trepagnier et al. |
| 8,428,863 B2 | 4/2013 | Kelly et al. |
| 8,428,864 B2 | 4/2013 | Kelly et al. |
| 8,392,064 B2 | 5/2013 | Thrun et al. |
| 8,434,919 B2 | 5/2013 | Schofield |
| 8,447,509 B2 | 5/2013 | Kelly et al. |
| 8,457,877 B2 | 6/2013 | Kelly et al. |
| 8,477,290 B2 | 7/2013 | Yamada |
| 8,550,196 B2 | 10/2013 | Ross |
| 8,583,358 B2 | 11/2013 | Kelly et al. |
| 8,589,014 B2 | 11/2013 | Fairfield et al. |
| 8,589,062 B2 | 11/2013 | Kelly et al. |
| 8,670,891 B1 | 3/2014 | Szybalski et al. |
| 8,742,325 B1 | 6/2014 | Droz et al. |
| 8,755,837 B2 | 6/2014 | Rhoads et al. |
| 8,767,190 B2 | 7/2014 | Hall |
| 8,788,446 B2 | 7/2014 | Yao et al. |
| 8,825,259 B1 | 9/2014 | Ferguson |
| 8,836,922 B1 | 9/2014 | Pennecot et al. |
| 8,880,272 B1 | 11/2014 | Ferguson et al. |
| 8,886,382 B2 | 11/2014 | Nettleton et al. |
| 8,892,496 B2 | 11/2014 | Yao et al. |
| 8,909,428 B1 | 12/2014 | Lombrozo |
| 8,930,128 B2 | 1/2015 | Kim et al. |
| 8,977,007 B1 | 3/2015 | Ferguson et al. |
| 8,996,224 B1 | 3/2015 | Herbach et al. |
| 8,965,578 B2 | 4/2015 | Versteeg et al. |
| 9,008,890 B1 | 4/2015 | Herbach et al. |
| 9,031,729 B2 | 5/2015 | Lathrop et al. |
| 9,046,371 B2 | 6/2015 | Casson et al. |
| 9,086,273 B1 | 7/2015 | Gruver et al. |
| 9,139,199 B2 | 9/2015 | Harvey |
| 9,146,553 B2 | 9/2015 | Nettleton et al. |
| D743,978 S | 11/2015 | Amin |
| 9,182,942 B2 | 11/2015 | Kelly et al. |
| 9,188,985 B1 | 11/2015 | Hobbs et al. |
| 9,194,168 B1 | 11/2015 | Lu et al. |
| 9,201,426 B1 | 12/2015 | Bonawitz |
| 9,213,934 B1 | 12/2015 | Versteeg et al. |
| 9,285,464 B2 | 3/2016 | Pennecot et al. |
| 9,290,201 B1 | 3/2016 | Lombrozo |
| 9,297,256 B2 | 3/2016 | Nettleton et al. |
| 9,315,212 B1 | 4/2016 | Kyrtsos et al. |
| 9,317,033 B2 | 4/2016 | Ibanez-Guzman et al. |
| 9,347,779 B1 | 5/2016 | Lynch |
| 9,367,065 B2 | 6/2016 | Dolgov et al. |
| 9,368,026 B1 | 6/2016 | Herbach et al. |
| 9,368,936 B1 | 6/2016 | Lenius et al. |
| 9,298,186 B2 | 7/2016 | Harvey |
| 9,382,797 B2 | 7/2016 | Nettleton et al. |
| 9,384,443 B2 | 7/2016 | Passot et al. |
| 9,384,666 B1 | 7/2016 | Harvey |
| 9,395,727 B1 | 7/2016 | Smith et al. |
| 9,396,441 B1 | 7/2016 | Rubin |
| 9,441,971 B2 | 9/2016 | Casson et al. |
| 9,459,622 B2 | 10/2016 | Abhyanker |
| 9,476,303 B2 | 10/2016 | Nettleton et al. |
| 9,494,439 B1 | 11/2016 | Ross et al. |
| 9,494,940 B1 | 11/2016 | Kentley |
| 9,494,943 B2 | 11/2016 | Harvey |
| 9,506,763 B2 | 11/2016 | Averbuch et al. |
| 9,507,346 B1 | 11/2016 | Levinson et al. |
| 9,517,767 B1 | 12/2016 | Kentley et al. |
| 9,522,699 B2 | 12/2016 | Raad et al. |
| 9,533,640 B2 | 1/2017 | Rai |
| 9,547,307 B1 | 1/2017 | Cullinane et al. |
| 9,606,539 B1 | 3/2017 | Kentley et al. |
| 9,612,123 B1 | 4/2017 | Levinson et al. |
| 9,613,274 B2 | 4/2017 | Stevens et al. |
| 9,630,619 B1 | 4/2017 | Kentley et al. |
| 9,632,502 B1 | 4/2017 | Levinson et al. |
| 9,637,117 B1 * | 5/2017 | Gusikhin .............. B60W 30/06 |
| 9,701,239 B2 | 7/2017 | Kentley et al. |
| 2001/0029425 A1 | 10/2001 | Myr |
| 2002/0131608 A1 | 9/2002 | Lobb et al. |
| 2002/0140924 A1 | 10/2002 | Wrangler et al. |

(56) References Cited

U.S. PATENT DOCUMENTS

| | | |
|---|---|---|
| 2003/0046021 A1 | 3/2003 | Lasky et al. |
| 2004/0017073 A1 | 1/2004 | Pavlov et al. |
| 2004/0068354 A1 | 4/2004 | Tabe |
| 2004/0168837 A1 | 9/2004 | Michaud et al. |
| 2004/0193374 A1 | 9/2004 | Hac et al. |
| 2004/0250614 A1 | 12/2004 | Ander |
| 2004/0264207 A1 | 12/2004 | Jones |
| 2005/0046584 A1 | 3/2005 | Breed |
| 2005/0107955 A1 | 5/2005 | Isaji et al. |
| 2005/0216181 A1 | 9/2005 | Estkowski et al. |
| 2006/0030987 A1 | 2/2006 | Akita |
| 2006/0064202 A1 | 3/2006 | Gutmann et al. |
| 2006/0070432 A1 | 4/2006 | Ander |
| 2006/0089763 A1 | 4/2006 | Barrett et al. |
| 2006/0175116 A1 | 8/2006 | Friedman et al. |
| 2006/0207820 A1 | 9/2006 | Joshi et al. |
| 2006/0208169 A1 | 9/2006 | Breed et al. |
| 2007/0096447 A1 | 5/2007 | Tabe |
| 2007/0246927 A1 | 10/2007 | Okada |
| 2008/0033645 A1 | 2/2008 | Levinson et al. |
| 2008/0084283 A1 | 4/2008 | Kalik |
| 2008/0097699 A1 | 4/2008 | Ono |
| 2008/0161987 A1 | 7/2008 | Breed |
| 2008/0309468 A1 | 12/2008 | Greene et al. |
| 2008/0316463 A1 | 12/2008 | Okada et al. |
| 2008/0320421 A1 | 12/2008 | Demaris et al. |
| 2009/0029826 A1 | 1/2009 | Eguchi et al. |
| 2009/0036090 A1 | 2/2009 | Cho et al. |
| 2009/0208109 A1 | 8/2009 | Kakinami et al. |
| 2009/0240647 A1 | 9/2009 | Green et al. |
| 2009/0276149 A1 | 11/2009 | Kauffman et al. |
| 2010/0045482 A1 | 2/2010 | Strauss |
| 2010/0106356 A1 | 4/2010 | Trepagnier et al. |
| 2010/0220141 A1 | 9/2010 | Ozawa |
| 2010/0235129 A1 | 9/2010 | Sharma et al. |
| 2010/0274449 A1 | 10/2010 | Yonak et al. |
| 2010/0275829 A1 | 11/2010 | Sporsheim |
| 2010/0292544 A1 | 11/2010 | Sherman et al. |
| 2010/0302528 A1 | 12/2010 | Hall |
| 2011/0029235 A1 | 2/2011 | Berry |
| 2011/0122729 A1 | 5/2011 | Hu et al. |
| 2011/0130111 A1 | 6/2011 | Crandall et al. |
| 2011/0199199 A1 | 8/2011 | Perkins |
| 2011/0216304 A1 | 9/2011 | Hall |
| 2011/0241862 A1 | 10/2011 | Debouk et al. |
| 2011/0255070 A1 | 10/2011 | Phillips et al. |
| 2011/0288684 A1 | 11/2011 | Farlow et al. |
| 2012/0035846 A1 | 2/2012 | Sakamoto et al. |
| 2012/0044043 A1 | 2/2012 | Nettleton et al. |
| 2012/0046818 A1 | 2/2012 | Nettleton et al. |
| 2012/0046927 A1 | 2/2012 | Nettleton et al. |
| 2012/0046983 A1 | 2/2012 | Nettleton et al. |
| 2012/0053703 A1 | 3/2012 | Nettleton et al. |
| 2012/0053775 A1 | 3/2012 | Nettleton et al. |
| 2012/0083960 A1 | 4/2012 | Zhu et al. |
| 2012/0136561 A1 | 5/2012 | Barker et al. |
| 2012/0163670 A1 | 6/2012 | Eaton et al. |
| 2012/0193153 A1 | 8/2012 | Wellborn et al. |
| 2012/0226391 A1 | 9/2012 | Fryer et al. |
| 2012/0256448 A1 | 10/2012 | Yasui et al. |
| 2012/0310465 A1 | 12/2012 | Boatright et al. |
| 2013/0006451 A1 | 1/2013 | Cooper et al. |
| 2013/0046421 A1 | 2/2013 | El Fassi et al. |
| 2013/0054133 A1 | 2/2013 | Lewis et al. |
| 2013/0060412 A1 | 3/2013 | Nakagawara et al. |
| 2013/0131908 A1 | 5/2013 | Trepagnier et al. |
| 2013/0144476 A1 | 6/2013 | Pinot et al. |
| 2013/0245877 A1 | 9/2013 | Ferguson et al. |
| 2013/0246301 A1 | 9/2013 | Radhakrishnan et al. |
| 2013/0268138 A1 | 10/2013 | Moughler et al. |
| 2013/0273968 A1 | 10/2013 | Rhoads et al. |
| 2013/0343071 A1 | 12/2013 | Nagaoka et al. |
| 2014/0032012 A1 | 1/2014 | Joshi et al. |
| 2014/0032049 A1 | 1/2014 | Moshchuk et al. |
| 2014/0088855 A1 | 3/2014 | Ferguson |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0132407 A1 | 5/2014 | Kumai et al. |
| 2014/0142830 A1 | 5/2014 | Bernzen et al. |
| 2014/0185880 A1 | 7/2014 | Fairfield et al. |
| 2014/0188343 A1 | 7/2014 | Yoshimura et al. |
| 2014/0188347 A1 | 7/2014 | Tabe |
| 2014/0210646 A1 | 7/2014 | Subramanya |
| 2014/0214255 A1 | 7/2014 | Dolgov et al. |
| 2014/0214260 A1 | 7/2014 | Eckert et al. |
| 2014/0218527 A1 | 8/2014 | Subramanya |
| 2014/0244151 A1 | 8/2014 | Matsubara et al. |
| 2014/0257661 A1 | 9/2014 | Schulman et al. |
| 2014/0297182 A1 | 10/2014 | Casson et al. |
| 2014/0303827 A1 | 10/2014 | Dolgov et al. |
| 2014/0309833 A1 | 10/2014 | Ferguson et al. |
| 2014/0333468 A1 | 11/2014 | Zhu et al. |
| 2014/0336935 A1 | 11/2014 | Zhu et al. |
| 2014/0343750 A1 | 11/2014 | Minemura et al. |
| 2014/0350790 A1 | 11/2014 | Akesson et al. |
| 2014/0358353 A1 | 12/2014 | Ibanez-Guzman et al. |
| 2014/0358427 A1 | 12/2014 | Fuhram |
| 2014/0365228 A1 | 12/2014 | Ng-Thow-Hing et al. |
| 2014/0370911 A1 | 12/2014 | Gorgenyi et al. |
| 2015/0006005 A1 | 1/2015 | Yu et al. |
| 2015/0012166 A1 | 1/2015 | Hauler et al. |
| 2015/0025708 A1 | 1/2015 | Anderson |
| 2015/0039157 A1 | 2/2015 | Wolfe et al. |
| 2015/0039167 A1 | 2/2015 | Ideshio et al. |
| 2015/0039391 A1 | 2/2015 | Hershkovitz et al. |
| 2015/0057871 A1 | 2/2015 | Ono et al. |
| 2015/0091374 A1 | 4/2015 | Lenius et al. |
| 2015/0094850 A1 | 4/2015 | Passot et al. |
| 2015/0127224 A1 | 5/2015 | Tabe |
| 2015/0127239 A1 | 5/2015 | Breed et al. |
| 2015/0131080 A1 | 5/2015 | Retterath et al. |
| 2015/0149019 A1 | 5/2015 | Pilutti et al. |
| 2015/0149022 A1 | 5/2015 | Harvey |
| 2015/0149088 A1 | 5/2015 | Attard et al. |
| 2015/0154545 A1 | 6/2015 | Skaaksrud et al. |
| 2015/0154546 A1 | 6/2015 | Skaaksrud et al. |
| 2015/0154554 A1 | 6/2015 | Skaaksrud |
| 2015/0154585 A1 | 6/2015 | Skaaksrud |
| 2015/0156253 A1 | 6/2015 | Skaaksrud et al. |
| 2015/0156254 A1 | 6/2015 | Skaaksrud |
| 2015/0156718 A1 | 6/2015 | Skaaksrud |
| 2015/0160024 A1 | 6/2015 | Fowe |
| 2015/0178998 A1 | 6/2015 | Attard et al. |
| 2015/0185034 A1 | 7/2015 | Abhyanker |
| 2015/0198445 A1 | 7/2015 | Casson et al. |
| 2015/0234387 A1 | 8/2015 | Mullan et al. |
| 2015/0248131 A1 | 9/2015 | Fairfield et al. |
| 2015/0248689 A1 | 9/2015 | Paul et al. |
| 2015/0254986 A1 | 9/2015 | Fairfield et al. |
| 2015/0258928 A1 | 9/2015 | Goto et al. |
| 2015/0266488 A1 | 9/2015 | Solyom et al. |
| 2015/0268665 A1 | 9/2015 | Ludwick et al. |
| 2015/0271290 A1 | 9/2015 | Tao et al. |
| 2015/0285645 A1 | 10/2015 | Maise et al. |
| 2015/0292894 A1 | 10/2015 | Goddard et al. |
| 2015/0293228 A1 | 10/2015 | Retterath et al. |
| 2015/0298636 A1 | 10/2015 | Furst |
| 2015/0321606 A1 | 11/2015 | Vartanian et al. |
| 2015/0331422 A1 | 11/2015 | Hartung et al. |
| 2015/0336502 A1 | 11/2015 | Hillis et al. |
| 2015/0336524 A1 | 11/2015 | Larner et al. |
| 2015/0338226 A1 | 11/2015 | Mason et al. |
| 2015/0338852 A1 | 11/2015 | Ramanujam |
| 2015/0339928 A1 | 11/2015 | Ramanujam |
| 2015/0346727 A1* | 12/2015 | Ramanujam ....... B62D 15/0285<br>701/23 |
| 2015/0348221 A1 | 12/2015 | Pedersen et al. |
| 2015/0356368 A1 | 12/2015 | Liu et al. |
| 2015/0359032 A1 | 12/2015 | Menard et al. |
| 2015/0370251 A1 | 12/2015 | Siegel et al. |
| 2015/0370255 A1 | 12/2015 | Harvey |
| 2015/0375764 A1 | 12/2015 | Rajendran et al. |
| 2016/0009291 A1 | 1/2016 | Pallett et al. |

(56) References Cited

U.S. PATENT DOCUMENTS

| | | |
|---|---|---|
| 2016/0016312 A1 | 1/2016 | Lawrence, III et al. |
| 2016/0016315 A1 | 1/2016 | Kuffner, Jr. et al. |
| 2016/0047901 A1 | 2/2016 | Pacala et al. |
| 2016/0071278 A1 | 3/2016 | Leonard et al. |
| 2016/0033963 A1 | 4/2016 | Noh |
| 2016/0101811 A1 | 4/2016 | Kyrtsos et al. |
| 2016/0107509 A1 | 4/2016 | Kirsch et al. |
| 2016/0107703 A1 | 4/2016 | Briceno et al. |
| 2016/0129787 A1 | 5/2016 | Netzer |
| 2016/0159402 A1 | 6/2016 | Nakaya et al. |
| 2016/0159407 A1 | 6/2016 | Holmstrom et al. |
| 2016/0167608 A1 | 6/2016 | Rai |
| 2016/0169683 A1 | 6/2016 | Lynch |
| 2016/0171521 A1 | 6/2016 | Ramirez et al. |
| 2016/0171637 A1 | 6/2016 | Rai |
| 2016/0171894 A1 | 6/2016 | Harvey |
| 2016/0178381 A1 | 6/2016 | Lynch |
| 2016/0187150 A1 | 6/2016 | Sherman et al. |
| 2016/0189544 A1 | 6/2016 | Ricci |
| 2016/0207454 A1 | 7/2016 | Cuddihy et al. |
| 2016/0209220 A1 | 7/2016 | Laetz |
| 2016/0221186 A1 | 8/2016 | Perrone |
| 2016/0223343 A1 | 8/2016 | Averbuch et al. |
| 2016/0224028 A1 | 8/2016 | Harvey |
| 2016/0229451 A1 | 8/2016 | Raad et al. |
| 2016/0247106 A1 | 8/2016 | Dalloro et al. |
| 2016/0247109 A1 | 8/2016 | Scicluna et al. |
| 2016/0247394 A1 | 8/2016 | Stenneth |
| 2016/0251016 A1 | 9/2016 | Pallett et al. |
| 2016/0265930 A1 | 9/2016 | Thakur |
| 2016/0266581 A1 | 9/2016 | Dolgov et al. |
| 2016/0274590 A1 | 9/2016 | Harvey |
| 2016/0280258 A1 | 9/2016 | Lavoie et al. |
| 2016/0280267 A1 | 9/2016 | Lavoie et al. |
| 2016/0334797 A1 | 11/2016 | Ross et al. |
| 2016/0347329 A1 | 12/2016 | Zelman et al. |
| 2016/0355092 A1 | 12/2016 | Higuchi et al. |
| 2016/0362045 A1 | 12/2016 | Vegt et al. |
| 2016/0368492 A1 | 12/2016 | Al-Stouhi |
| 2016/0370194 A1 | 12/2016 | Colijn et al. |
| 2016/0371979 A1 | 12/2016 | Casson et al. |
| 2017/0028966 A1 | 2/2017 | Elie et al. |
| 2017/0030127 A1 | 2/2017 | Elie et al. |
| 2017/0030128 A1 | 2/2017 | Elie et al. |
| 2017/0030134 A1 | 2/2017 | Elie et al. |
| 2017/0030135 A1 | 2/2017 | Elie et al. |
| 2017/0030737 A1 | 2/2017 | Elie et al. |
| 2017/0032599 A1 | 2/2017 | Elie et al. |
| 2017/0060234 A1 | 3/2017 | Sung |
| 2017/0067747 A1 | 3/2017 | Ricci |
| 2017/0075358 A1 | 3/2017 | Zhang |
| 2017/0076603 A1* | 3/2017 | Bostick .............. G08G 1/143 |
| 2017/0120753 A1 | 5/2017 | Kentley |
| 2017/0120803 A1 | 5/2017 | Kentley et al. |
| 2017/0120804 A1 | 5/2017 | Kentley et al. |
| 2017/0120814 A1 | 5/2017 | Kentley et al. |
| 2017/0120902 A1 | 5/2017 | Kentley et al. |
| 2017/0120904 A1 | 5/2017 | Kentley et al. |
| 2017/0123419 A1 | 5/2017 | Levinson et al. |
| 2017/0123421 A1 | 5/2017 | Kentley et al. |
| 2017/0123422 A1 | 5/2017 | Kentley et al. |
| 2017/0123428 A1 | 5/2017 | Levinson et al. |
| 2017/0123429 A1 | 5/2017 | Levinson et al. |
| 2017/0124476 A1 | 5/2017 | Levinson et al. |
| 2017/0124781 A1 | 5/2017 | Levinson et al. |
| 2017/0126810 A1 | 5/2017 | Kentley et al. |
| 2017/0132334 A1 | 5/2017 | Levinson et al. |
| 2017/0132934 A1 | 5/2017 | Kentley et al. |
| 2017/0168493 A1* | 6/2017 | Miller .............. G05D 1/0225 |
| 2017/0267233 A1* | 9/2017 | Minster .............. B62D 15/02 |
| 2018/0039974 A1* | 2/2018 | Powell .............. G06Q 20/3224 |
| 2018/0043884 A1* | 2/2018 | Johnson .............. B60W 30/06 |
| 2018/0095474 A1* | 4/2018 | Batur .............. G06K 9/4604 |
| 2018/0299900 A1* | 10/2018 | Bae .............. G05D 1/0238 |

FOREIGN PATENT DOCUMENTS

| | | |
|---|---|---|
| EP | 2549456 | 1/2013 |
| EP | 2626760 | 8/2013 |
| GB | 2460916 | 12/2009 |
| GB | 2520493 | 5/2015 |
| JP | 2011248855 | 12/2011 |
| RU | 2269813 | 2/2006 |
| RU | 103114 | 3/2011 |
| RU | 140935 | 5/2014 |
| WO | WO1993007016 | 4/1993 |
| WO | WO2003073123 | 9/2003 |
| WO | WO2009151781 | 12/2009 |
| WO | WO2011098848 | 8/2011 |
| WO | WO2011154681 | 12/2011 |
| WO | WO2012172526 | 12/2012 |
| WO | WO2013087527 | 6/2013 |
| WO | WO2014021961 | 2/2014 |
| WO | WO2014129944 | 8/2014 |
| WO | WO2015026471 | 2/2015 |
| WO | WO2015099679 | 7/2015 |
| WO | WO2015134152 | 9/2015 |
| WO | WO2015155133 | 10/2015 |
| WO | WO2015197826 | 12/2015 |
| WO | WO2014079222 | 5/2017 |
| WO | WO2017079219 | 5/2017 |
| WO | WO2017079228 | 5/2017 |
| WO | WO2017079229 | 5/2017 |
| WO | WO2017079289 | 5/2017 |
| WO | WO2017079290 | 5/2017 |
| WO | WO2017079301 | 5/2017 |
| WO | WO2017079304 | 5/2017 |
| WO | WO2017079311 | 5/2017 |
| WO | WO2017079321 | 5/2017 |
| WO | WO2017079332 | 5/2017 |
| WO | WO2017079341 | 5/2017 |
| WO | WO2017079349 | 5/2017 |
| WO | WO2017079460 | 5/2017 |
| WO | WO2017079474 | 5/2017 |

OTHER PUBLICATIONS

Group Induction; Teichman, Alex, Thrun, Sebastian, Proc. Of the IEEE/RSJ Intl Conf on Intelligent Robotics and Systems (IROS) (2013).

Automatic Online Calibration of Cameras and Lasers; Levinson, Jesse, Thrun, Sebastian; Robotics: Science and Systems (RSS) (2013).

Precision Tracking With Sparse 3D and Dense Color 2D Data; Held, David, Levinson, Jesse, Thrun, Sebastian; International Conference on Robotics and Automation (ICRA) (2013).

Online Slam With Any-Time Self-Calibration and Automatic Change Detection; Nima Keivan and Gabe Sibley; IEEE International Conference on Robotics and Automation (ICRA) (2014).

Online, Semi-Supervised Learning for Long-Term Interaction With Object Recognition Systems; Teichman, Alex, Thrun, Sebastian; RSS Workshop on Long-Term Operation of Autonomous Robotic Systems in Changing Environments (2012).

Tracking-Based Semi-Supervised Learning; Teichman, Alex, Thrun, Sebastian; International Journal of Robotics Research (IJRR); http://ijr.sagepub.com/content/31/7/804; (2012).

A Probabilistic Framework for Object Detection in Images Using Context and Scale; Held, David, Levinson, Jesse, Thrun, Sebastian; International Conference on Robotics and Automation (ICRA) (2012).

Practical Object Recognition in Autonomous Driving and Beyond; Teichman, Alex, Thrun, Sebastian, IEEE Workshop on Advanced Robotics and its Social Impacts (ARSO) (2011).

Tracking-Based Semi-Supervised Learning: Teichman, Alex, Thrun, Sebastian; Robotics: Science and Systems (RSS) (2011).

Towards 3D Object Recognition Via Classification of Arbitrary Object Tracks; Teichman, Alex, Levinson, Jesse, Thrun, Sebastian; International Conference on Robotics and Automation (ICRA) (2011).

(56) References Cited

OTHER PUBLICATIONS

Towards Fully Autonomous Driving: Systems and Algorithms; Levinson, Jesse et al.; Intelligent Vehicles Symposium (2011).
Traffic Light Mapping, Localization, and State Detection for Autonomous Vehicles; Levinson, Jesse, Askeland, Jake, Dolson, Jennifer, Thrun, Sebastian; International Conference on Robotics and Automization (ICRA) (2011).
Automatic Laser Calibration, Mapping, and Localization for Autonomous Vehicles; Levinson, Jesse; Thesis (Ph D); Stanford University (2011).
Unsupervised Calibration for Multi-Beam Lasers; Levinson, Jesse, Thrun, Sebastian, International Symposium on Experimental Robotics (ISER) (2010).
Robust Vehicle Localization in Urban Environments Using Probabilistic Maps; Levinson, Jesse, Thrun, Sebastian; International Conference on Robotics and Automation (ICRA) (2010).
Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009).
Map-Based Precision Vehicle Localization in Urban Environments; Levinson, Jesse, Thrun, Sebastian; Robotics: Science and Systems (RSS) (2007).
Stanford Autonomous Driving Team website http://driving.stanford.edu/papers.html; Various; Stanford University (2014).
Combining Data-Driven and Model-Based Cues for Segmentation of Video Sequences; Eckes, Christian, Vorbruggen, Jan C.; Proceedings WCNN '96, San Diego, USA (1996).
A Real-Time Motion Planner With Trajectory Optimization for Autonomous Vehicles; Xu, Wenda et al.; Robotics and Automation (ICRA); Saint Paul, MN, USA (2012).
Dynamic Real-Time Replanning in Belief Space: An Experimental Study on Physical Mobile Robots; Agha-mohammadi, Ali-Akbar et al.; Technical Report TR 13-007; Texas A&M University, USA (2013).
An Evaluation of Dynamic Object Tracking With 3D Lidar; Morton P., Douillard, B., Underwood, J.; Proceedings of Australasian Conference on Robotics and Automation; Dec. 7-9, 2011; Melbourne, Australia (2011).
Control of Robotic Mobility-On Demand Systems: A Queuing-Theoretical Perspective; Zhang, Rick; Pavone, Marco; Intl Journal of Robotics Research, pp. 1-18, Stanford, USA (2015).
Evaluation of Urban Vehicle Routing Algorithms; Kong, Linghe et al.; Intl Journal of Digital Content Technology and its Applications (IDCTA); vol. 6, No. 23, University of New Mexico, USA (2012).
Real-Time High Resolution Fusion of Depth Maps on GPU; Trifonov, Dmitry; Intl Conference on Computer-Aided Design and Computer Graphics (CAD/Graphics); Guangzhou, China (2013).
Real-Time Image Segmentation on a GPU; Abramov, Alexey et al.; Facing the Multi-Core Challenge, pp. 131-142, Berlin, Germany (2010).
A Tutorial on Graph-Based Slam; Grisetti, Giorgio et al.; Intelligent Transportation Systems Magazine, IEEE; pp. 31-43 (2010).
Sensor Fusion and Calibration of Inertial Sensors, Vision, Ultra-Wideband and GPS; HOL, Jeroen; Linkoping Studies in Science and Technology, Dissertations No. 1368; Department of Electrical Engineering; Linkoping University, SE-581 83 Linkoping, Sweden (2011).
Large Scale Dense Visual Inertial Slam; Ma, Lu et al.; Field and Service Robotics (FSR) (2015).
Simultaneous Localization, Mapping, and Manipulation for Unsupervised Object Discovery; Ma, Lu et al.; IEEE International Conference on Robotics and Automation (ICRA) (2014).
Office Action for U.S. Appl. No. 14/932,940, dated May 4, 2016, Levinson et al., "Automated Extraction of Semantic Information to Enhance Incremental Mapping Modifications for Robotic Vehicles", 22 pages.
Office Action for U.S. Appl. No. 14/932,952, dated Jun. 24, 2016, Kentley et al., "Resilient Safety System for a Robotic Vehicle", 11 pages.
Easymile (website), Retrieved from <https://web.archive.org/web/20150723060050/http://easymile.com> Jul. 2015, <https://web.archive.org/web/201508012054107/http://easymile.com/mobility-solution/>, Aug. 2015.
Office Action for U.S. Appl. No. 14/932,959, dated Aug. 5, 2016, Kentley et al., "Autonomous Vehicle Fleet Service and System", 16 pages.
Swarming Behavior Using Probabilistic Roadmap Techniques; Bayazit et al., Swarm Robotics WS 2004, LNCS, Springer-Verlag Berlin Heidelberg, pp. 112-125 (2005).
Office Action for U.S. Appl. No. 14/932,963, dated Aug. 15, 2016, Levinson et al., "Adaptive Mapping to Navigate Autonomous Vehicles Responsive to Physical Environment Changes", 15 pages.
Office Action for U.S. Appl. No. 14/756,992, dated Aug. 25, 2016, Levinson et al., "Adaptive Autonomous Vehicle Planner Logic", 9 pages.
Office Action for U.S. Appl. No. 14/933,469, dated Aug. 30, 2016, Kentley et al., "Software Application to Request and Control an Autonomous Vehicle Service", 11 pages.
Monocular Camera Trajectory Optimization Using Lidar Data, Bodensteiner et al., IEEE International Conference on Computer Vision Workshops, 2011, 8 pages.
Office Action for U.S. Appl. No. 14/932,962, dated Mar. 21, 2016, Kentley et al., "Robotic Vehicle Active Safety Systems and Methods", 18 pages.
Office Action for U.S. Appl. No. 14/932,963, dated Mar. 17, 2016, Levinson et al., "Adaptive Mapping to Navigate Autonomous Vehicles Responsive to Physical Environment Changes," 26 pages.
Toward Robotic Cards; Thrun, Sebastian; Communications of the ACM, vol. 53, No. 4, Apr. 2010.
Office Action for U.S. Appl. No. 14/933,602, dated Aug. 19, 2016, Levinson et al., "Machine-Learning Systems and Techniques to Optimize Teleoperation and/or Planner Decisions," 37 pages.
Notice of Allowance and Fee(s) Due for U.S. Appl. No. 14/933,602, dated Dec. 14, 2016, Levinson et al., "Machine-Learning Systems and Techniques to Optimize Teleoperation and/or Planner Decisions," 31 pages.
Corrected Notice of Allowability for U.S. Appl. No. 14/933,602, dated Jan. 13, 2017, Levinson et al., "Machine-Learning Systems and Techniques to Optimize Teleoperation and/or Planner Decisions," 2 pages.
Kuznetsov, S., International Search Report and the Written Opinion of the International Searching Authority for International Patent Application No. PCT/US2016/060384, dated May 4, 2017.
Office Action for U.S. Appl. No. 14/757,015, dated Mar. 27, 2017, Kentley, Timothy David, "Independent Steering, Power Torque Control and Transfer in Autonomous Vehicles," 58 pages.
Koutsorodis, Dafani, International Search Report and the Written Opinion of the International Searching Authority for International Patent Application No. PCT/US2016/060104, dated Feb. 2, 2017.
Sokolov, D., International Search Report and the Written Opinion of the International Searching Authority for International Patent Application No. PCT/US2016/060121, dated Mar. 30, 2017.
Office Action for U.S. Appl. No. 14/932,959, dated Mar. 16, 2016, Kentley et al., "Autonomous Vehicle Fleet Service and System," 33 pages.
Office Action for U.S. Appl. No. 14/932,959, dated Aug. 5, 2016, Kentley et al., "Autonomous Vehicle Fleet Service and System," 25 pages.
Office Action for U.S. Appl. No. 14/932,959, dated Dec. 2, 2016, Kentley et al., "Autonomous Vehicle Fleet Service and System," 53 pages.
Notice of Allowance and Fee(s) Due for U.S. Appl. No. 14/932,959, dated Feb. 10, 2017, Kentley et al., "Autonomous Vehicle Fleet Service and System," 36 pages.
Sokolov, D., International Search Report and the Written Opinion of the International Searching Authority for International Patent Application No. PCT/US2016/060021, dated Mar. 30, 2017.
Sokolov, D., International Search Report and the Written Opinion of the International Searching Authority for International Patent Application No. PCT/US2016/060030, dated Mar. 30, 2017.

(56) References Cited

OTHER PUBLICATIONS

Office Action for U.S. Appl. No. 14/932,963, dated Mar. 17, 2016, Levinson et al., "Adaptive Mapping to Navigate Autonomous Vehicles Responsive to Physical Environment Changes," 60 pages.
Office Action for U.S. Appl. No. 14/932,963, dated Aug. 15, 2016, Levinson et al., "Adaptive Mapping to Navigate Autonomous Vehicles Responsive to Physical Environment Changes," 44 pages.
Notice of Allowance and Fee(s) Due for U.S. Appl. No. 14/932,963, dated Feb. 15, 2017, Levinson et al., "Adaptive Mapping to Navigate Autonomous Vehicles Responsive to Physical Environment Changes," 50 pages.
Office Action for U.S. Appl. No. 14/932,962, dated Mar. 21, 2016, Kentley et al., "Robotic Vehicle Active Safety Systems and Methods," 47 pages.
Notice of Allowance and Fee(s) Due for U.S. Appl. No. 14/932,962, dated Jul. 26, 2016, Kentley et al., "Robotic Vehicle Active Safety Systems and Methods," 31 pages.
Notice of Allowability for U.S. Appl. No. 14/932,962, dated Aug. 23, 2016, Kentley et al., "Robotic Vehicle Active Safety Systems and Methods," 6 pages.
Collision Warning and Sensor Data Processing in Urban Areas, Mertz et al., The Robotics Institute, Carnegie Mellon University, School of Computer Science, Research Shocase @ CMU (Jun. 2005).
Notice of Allowance and Fee(s) Due for U.S. Appl. No. 14/932,962, dated Mar. 2, 2017, Kentley et al., "Robotic Vehicle Active Safety Systems and Methods," 58 pages.
Corrected Notice of Allowability for U.S. Appl. No. 14/932,962, dated Mar. 9, 2017, Kentley et al., "Robotic Vehicle Active Safety Systems and Methods," 5 pages.
ISA, Sabine, International Search Report and the Written Opinion of the International Searching Authority for International Patent Application No. PCT/US2016/060183, dated Mar. 30, 2017.
Office Action for U.S. Appl. No. 14/756,994, dated Jan. 26, 2017, Kentley et al., "System of Configuring Active Lighting to Indicate Directionality of an Autonomous Vehicle," 19 pages.
Notice of Allowance and Fee(s) Due for U.S. Appl. No. 14/756,994, dated Jun. 2, 2017, Kentley et al., "System of Configuring Active Lighting to Indicate Directionality of an Autonomous Vehicle," 9 pages.
Office Action for U.S. Appl. No. 14/756,991, dated Feb. 28, 2017, Levinson et al., "Sensor-Based Object-Detection Optimization for Autonomous Vehicles," 30 pages.
Efficient Power Conversion, "Why GaN circuits make better Lidar," retrieved on Jul. 18, 2017 at <<http://epc-co.com/epc/DesignSupport/TrainingVideos/eGaNDemos/GaN-circuts-make-better-LiDAR. aspx>>, 2 pages.
Kang, Sung Chul, International Search Report and Written Opinion of the International Searching Authority for International Patent Application No. PCT/US2014/047864, dated Nov. 19, 2014, 10 pages.
Notice of Allowance and Fee(s) Due for U.S. Appl. No. 14/462,075, dated Nov. 18, 2015, Pennecot et al., "Devices and Methods for a Rotating Lidar Platform With a Shared Transmit/Receive Path," 8 pages.
Office Action for U.S. Appl. No. 14/462,075, dated Jun. 17, 2015, Pennecot et al., "Devices and Methods for a Rotating Lidar Platform With a Shared Transmit/Receive Path," 14 pages.
Rim et al., "The Optical Advantages of Curved Focal Plane Arrays," Optics Express, vol. 16, No. 7, Mar. 31, 2008, 7 pages.
Xu et al., "A Calibration Method of the Multi-Channel Imaging Lidar," SPIE Proceedings, vol. 9080, Lasar Radar Technology and Applications XIX; And Atmpospheric Propagation XI, 90800V (Jun. 9, 2014), doi:10.1117/12.2049678, 2 pages.
Notice of Allowance and Fee(s) Due for U.S. Appl No. 14/756,991, dated Jun. 20, 2017, Levinson et al., "Sensor-Based Object-Detection Optimization for Autonomous Vehicles," 8 pages.
Zadunaev, D., International Search Report and Written Opinion of the International Searching Authority for International Patent Application No. PCT/US2016/060183, dated Mar. 16, 2017, 8 pages.

Office Action for U.S. Appl. No. 14/756,992, dated Aug. 25, 2016, Levinson et al., "Adaptive Autonomous Vehicle Planner Logic," 11 pages.
Office Action for U.S. Appl. No. 14/756,992, dated Jan. 4, 2017, Levinson et al., "Adaptive Autonomous Vehicle Planner Logic," 13 pages.
Advisory Action for U.S. Appl. No. 14/756,992, dated Mar. 13, 2017, Levinson et al., "Adaptive Autonomous Vehicle Planner Logic," 3 pages.
Office Action for U.S. Appl. No. 14/756,992, dated Jun. 1, 2017, Levinson et al., "Adaptive Autonomous Vehicle Planner Logic," 14 pages.
Zamakhaev, K., International Search Report and Written Opinion of the International Searching Authority for International Patent Application No. PCT/US2016/060029, dated Apr. 27, 2017, 6 pages.
Office Action for U.S. Appl. No. 14/756,993, dated Jul. 19, 2017, Kentley et al., "Method for Robotic Vehicle Communication With an External Environment Via Acoustic Beam Forming," 25 pages.
Zamakhaev, K., International Search Report and Written Opinion of the International Searching Authority for International Patent Application No. PCT/US2016/060161, dated Jun. 8, 2017, 9 pages.
Office Action for U.S. Appl. No. 14/756,995, dated Oct. 31, 2016, Kentley et al., "Coordination of Dispatching and Maintaining Fleet of Autonomous Vehicles," 36 pages.
Office Action for U.S. Appl. No. 14/756,995, dated Apr. 5, 2017, Kentley et al., "Coordination of Dispatching and Maintaining Fleet of Autonomous Vehicles," 38 pages.
Zamakhaev, K., International Search Report and Written Opinion of the International Searching Authority for International Patent Application No. PCT/US2016/060105, dated Mar. 30, 2017, 7 pages.
Office Action for U.S. Appl. No. 14/756,996, dated May 4, 2017, Douillard et al., "Calibration for Autonomous Vehicle Operation," 5 pages.
Zamakhaev, K., International Search Report and Written Opinion of the International Searching Authority for International Patent Application No. PCT/US2016/060118, dated Mar. 30, 2017, 7 pages.
GPS Logger: Methods for Determining the Mileage of Vehicles, May 31, 2012, Retrieved from Internet on Jul. 21, 2017 at <<http://www.gpslogger.ru/odometer/>>.
Office Action for U.S. Appl. No. 14/932,940, dated May 4, 2016, Levinson et al., "Automated Extraction of Semantic Information to Enhance Incremental Mapping Modifications for Robotic Vehicles," 23 pages.
Office Action for U.S. Appl. No. 14/932,940, dated Nov. 22, 2016, Levinson et al., "Automated Extraction of Semantic Information to Enhance Incremental Mapping Modifications for Robotic Vehicles," 30 pages.
Notice of Allowance and Fee(s) Due for U.S. Appl. No. 14/932,940, dated Apr. 7, 2017, Levinson et al., "Automated Extraction of Semantic Information to Enhance Incremental Mapping Modifications for Robotic Vehicles," 8 pages.
Zamakhaev, K., International Search Report and Written Opinion of the International Searching Authority for International Patent Application No. PCT/US2016/060173, dated May 11, 2017, 7 pages.
Joaquin, Vano Gea, International Search Report and Written Opinion of the International Searching Authority for International Patent Application No. PCT/US2016/060018, dated Feb. 14, 2017, 12 pages.
Office Action for U.S. Appl. No. 14/932,948, dated Jul. 29, 2016, Kentley et al., "Active Lighting Control for Communicating a State of an Autonomous Vehicle to Entities in a Surrounding Environment," 6 pages.
Office Action for U.S. Appl. No. 14/932,948, dated Oct. 14, 2016, Kentley et al., "Active Lighting Control for Communicating a State of an Autonomous Vehicle to Entities in a Surrounding Environment," 16 pages.
Office Action for U.S. Appl. No. 14/932,948, dated Mar. 21, 2017, Kentley et al., "Active Lighting Control for Communicating a State of an Autonomous Vehicle to Entities in a Surrounding Environment," 20 pages.
Office Action for U.S. Appl. No. 14/932,952, dated Jun. 24, 2016, Kentley et al., "Resilient Safety System for a Robotic Vehicle," 12 pages.

(56) References Cited

OTHER PUBLICATIONS

Office Action for U.S. Appl. No. 14/932,952, dated Jan. 10, 2017, Kentley et al., "Resilient Safety System for a Robotic Vehicle," 18 pages.
Komarchuk, A., International Search Report and Written Opinion of the International Searching Authority for International Patent Application No. PCT/US2016/060130, dated Apr. 6, 2017, 9 pages.
Office Action for U.S. Appl. No. 14/933,469, dated Aug. 30, 2016, Kentley et al., "Software Application to Request and Control Autonomous Vehicle Service," 12 pages.
Office Action for U.S. Appl. No. 14/933,469, dated Jan. 5, 2017, Kentley et al., "Software Application to Request and Control Autonomous Vehicle Service," 12 pages.
Advisory Action for U.S. Appl. No. 14/933,469, dated Mar. 17, 2017, Kentley et al., "Software Application to Request and Control Autonomous Vehicle Service," 3 pages.
Zamakhaev, K., International Search Report and Written Opinion of the International Searching Authority for International Patent Application No. PCT/US2016/060368, dated Apr. 27, 2017, 11 pages.
Office Action for U.S. Appl. No. 14/933,469, dated Jun. 22, 2017, Kentley et al., "Software Application to Request and Control Autonomous Vehicle Service," 8 pages.
Office Action for U.S. Appl. No. 14/933,706, dated Feb. 14, 2017, Kentley et al., "Interactive Autonomous Vehicle Command Controller," 9 pages.
Office Action for U.S. Appl. No. 14/933,706, dated Jun. 5, 2017, Kentley et al., "Interactive Autonomous Vehicle Command Controller," 20 pages.
Programmer's Guide, ChargePoint Web Services API Version 4.1, Document Part No. 75-001102-01, Revision 4, May 16, 2014, Retrieved on the Internet at <https://na.chargepoint.com/UI/downloads/en/ChargePoint_Web_Services_API_Guide_Ver4.1_Rev4.pdf>.

\* cited by examiner

AUTONOMOUS VEHICLE LOGIC TO IDENTIFY PERMISSIONED PARKING RELATIVE TO MULTIPLE CLASSES OF RESTRICTED PARKING

FIELD

Various embodiments relate generally to autonomous vehicles and associated mechanical, electrical and electronic hardware, computing software, including autonomy applications, image processing applications, etc., computing systems, and wired and wireless network communications to facilitate autonomous control of vehicles, and, more specifically, to systems, devices, and methods configured to identify permissioned parking relative to multiple classes of restricted and privileged parking.

BACKGROUND

Multiple approaches to developing driverless vehicles and automating conventional vehicles (e.g., manually-driven automotive vehicles) are principally directed to autonomous driving based on sensor data, such as image data, location data, radar, etc. These autonomous driving approaches generally focus on navigating a vehicle from a first location to a second location with little to no human involvement. In some approaches, semi-autonomous and fully-autonomous vehicles require a human driver to identify signs, symbols, and the like to determine a location to park an autonomous vehicle while complying with all laws, restrictions, or privileges associated with the parking location.

Certain approaches to parking an autonomous vehicle may include analyzing a parking space with onboard sensors to determine parking space size, allowing an autonomous system to physically maneuver an autonomous vehicle into the parking space. However, contemporary systems do not address the issue of restrictions and permissions associated with the parking space. This is more problematic in dense cities where multiple parking permissions and restrictions may apply to a single parking space.

Thus, what is needed is a solution for identifying, with little to no human involvement, permissioned parking relative to multiple classes of restricted and privileged parking.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
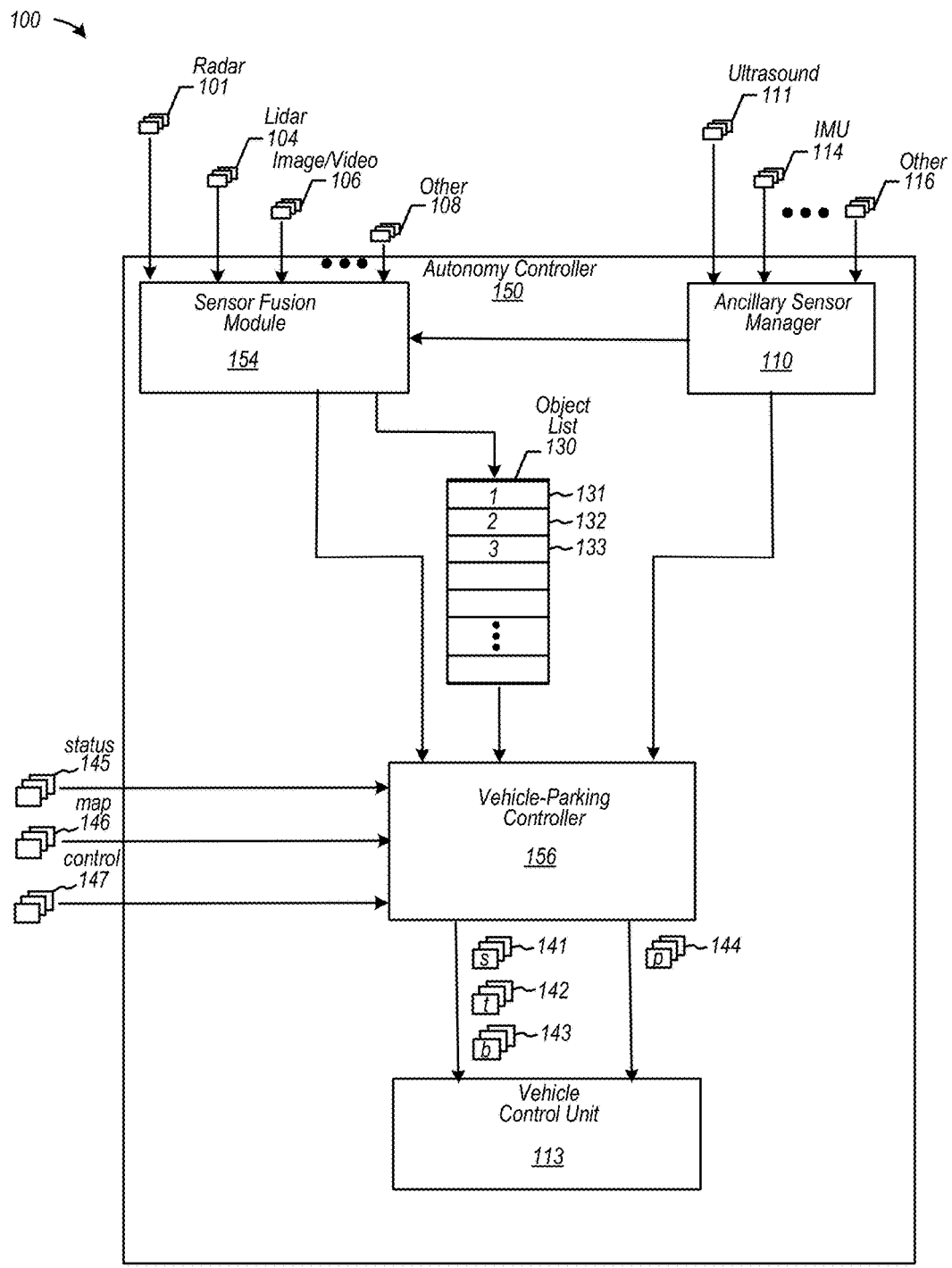
FIG. 1 is a diagram depicting an example of an autonomy controller, according to some embodiments.

FIG. 1 is a diagram depicting an example of an autonomy controller, according to some embodiments. Diagram 100 depicts autonomy controller 150 including a sensor fusion module 154 configured to generate an object list 130. Autonomy controller 150 also includes an ancillary sensor manager 110, a vehicle-parking controller 156, and a vehicle control unit 113. As shown, autonomy controller 150 may be configured to receive radar sensor data 101, lidar sensor data 104, image/video data 106, and other sensor data 108, each of which may be received into sensor fusion module 154. Sensor fusion module 154 receives data from the various sources of sensor data, as shown, and may combine or analyze data representing images of objects based on different sensor data from different sensors to generate object list 130. For example, sensor fusion module 154 may analyze, compare, and reconcile image data, radar data, and lidar data to identify an object, such as a pedestrian. In some examples, sensor fusion module 154 may implement a Kalman filter (e.g., an extended Kalman filter), or any other object estimation techniques or algorithms.

Autonomy controller 150 also may be configured to receive ultrasound sensor data 111, inertial measurement unit ("IMU") data 114, and other sensor data 116 (e.g., GPS and INS data), each of which may be received into ancillary sensor manager 110 or any component of autonomy controller 150. Ancillary sensor manager 110 may, in some examples, be configured to facilitate localization or any other function performed by components of an autonomous vehicle. In the example shown, sensor fusion module 154 may detect and classify objects to generate an object list 130, which includes a list of objects, such as object ("1") 131, object ("2") 132, object ("3") 133, etc. The objects may represent detected and/or classified objects detected by one or more sensors. For example, objects 131, 132, and 133 may include static objects, such as a street sign, and dynamic objects, such as vehicles and pedestrians. In some examples, object list 130 may be generated at 30 frames per second, or at other frame rates.

Further, autonomy controller 150 may receive status data 145, map data 146, and control data 147. Status data 145 may include state data about one or more components or sub-systems of an autonomous vehicle (e.g., existence of high temperatures in an electrical power plant or in other electronics, a state of power degradation or voltage degradation, etc.). Control data 147, which may be optionally applied, may include data representing supplemental commands originating from, for example, a vehicular autonomy platform (not shown). One or more elements depicted in diagram 100 of FIG. 1 may include structures and/or functions as similarly-named or similarly-numbered elements depicted in other drawings, or as otherwise described herein, in accordance with one or more examples.

According to some examples, vehicle-parking controller 156 may be configured to perform path planning, such as selecting a parking path of travel that is collision-free, among other things. Vehicle-parking controller 156 may compute any number of paths of motion and select an optimal parking path of travel based on map data 146, object list 130, and other data, including sensor data, and parking characteristic data including time of day, day of the week, day of the year, user schedule, parking restrictions, parking privileges of a user, physical disability or restrictions associated with a user, and other factors. Vehicle-parking controller 156, responsive to determining a parking space based on parking characteristic data, may also generate drive parameters as (or as part of) command data, such as steering data 141, throttle data 142, braking data 143, positioning data 144, or any other data for execution by vehicle control unit 113 to autonomously guide and position a vehicle in a parking space for which permission data is associated the vehicle or at least one occupant.

Any functionality of one or more components of autonomy controller 150 (e.g., sensor fusion module 154, ancillary sensor manager 110, vehicle-parking controller 156, and vehicle control unit 113) may be combined with any other component or may be distributed among any number of other components. In one example, either vehicle-parking controller 156 or sensor fusion module 154, or a combination thereof, may be configured to perform one or more functions of an advanced driver assistance system ("ADAS") to control an autonomous vehicle and/or be used as a safety controller in case a primary Autonomy/ADAS system is failing or otherwise operates sub-optimally. In some examples, autonomy controller 150 and any of its one or more components may be implemented in hardware or software (or a combination thereof). According to some examples, logic implemented in autonomy controller 150 may include executable instructions based on the Python programming language, C++ programming language, or any other programming language.

In a specific example, one or more components of autonomy controller 150 may be implemented as one or more processors, such as one or more graphics processing units ("GPUs") configured to implement a framework and programming model suitable for GPUs. For example, a programming language, such as 'Compute Unified Device Architecture' ("CUDA")-based language, or any other compatible programming language that may be used to program the GPUs. CUDA™ is produced and maintained by NVIDIA of Santa Clara, Calif. Note that other programming languages may be implemented, such as OpenCL, or any other parallel programming language. Further, one or more components of autonomy controller 150 may be configured to implement Deep Neural Networks ("DNN"), or variants thereof, and Convolutional Neural Networks ("CNN"), or variants thereof, as well as any other equivalent neural networks or deep learning techniques.

Figure 2:
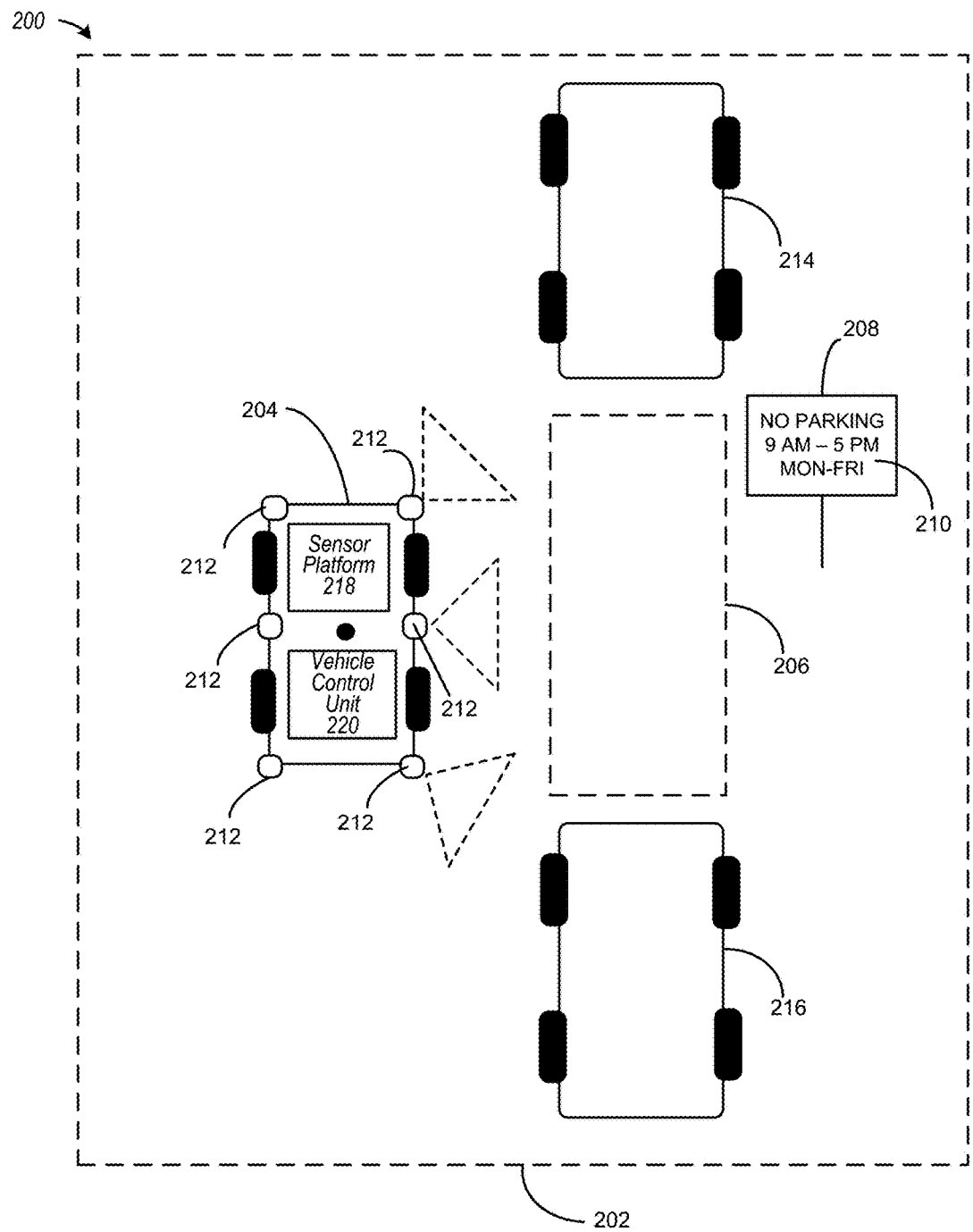
FIG. 2 illustrates an example parking environment for one or more embodiments.

FIG. 2 illustrates an example parking environment 200 in a parking area 202. Parking area 202 may be a city block that is selected by a user or autonomously selected with autonomous vehicle 204 based on a schedule such as a scheduling calendar of an individual or a scheduling calendar of a company's fleet of vehicles. For instance, computer-based systems associated with autonomous vehicle 204 can make database queries (e.g., via BLUETOOTH to a mobile device's calendar application) to determine that a passenger of autonomous vehicle has an appointment at City Hall at 2:00 PM. Autonomous vehicle 204 may schedule routing to arrive at City Hall at 1:30 PM to initiate a search for parking within a range of distance from which the passenger may walk (e.g., at a predicted rate of walking speeds) from a parking space to the destination. Upon arrival at City Hall, autonomous vehicle 204 can initiate a search for available parking beginning at the entrance of City Hall and continuing along the perimeter of the nearest city block until an available parking place is determined.

A size of parking area 202 can be determined by one or more systems of autonomous vehicle 204. For instance, based on a calendar event and a time of day, size of parking area 202 may be determined to allow a passenger of autonomous vehicle 204 to exit the parked autonomous vehicle 204 at a parking place 206 close to a location associated with a scheduled appointment (e.g., lunch at a restaurant at noon). Hence, logic in autonomous vehicle 204 may be configured to facilitate performing a search for a permissioned parking place without the passenger or without manual user input.

In an embodiment, size of parking area 202 may be determined to encompass a passenger loading zone of a restaurant if autonomous vehicle 204 arrives at the restaurant within five minutes of the scheduled appointment time. In one example, data representing a policy may be configured to allow a vehicle to arrive at a parking zone at (or adjacent) to the restaurant (either under either autonomous or human control) for purposes of unloading one or more passengers, including a driver. Such a parking zone may not be a permissive parking place, but may be sufficient to safely allow passengers to exit the vehicle (e.g., a duration of a few minutes) nearest to an entry point of the destination. A vehicle-parking controller, such as vehicle-parking controller 156 of FIG. 1, may execute instructions in furtherance of the policy, whereby the vehicle may autonomously search for a parking spot of relatively longer durations. In some cases, a preference or priority may be assigned to either nearest parking spots (e.g., free public parking spots). In some cases, vehicle-parking controller may select parking spots for which payment is required either prior to entry (e.g., automatically via wireless payment) or at exit (e.g., manual payment by passenger upon arriving at parking spot).

If autonomous vehicle 204 arrives at the restaurant greater than five minutes ahead of the scheduled appointment time, size of parking area 202 may be determined have a radius no greater than a one block from the restaurant, giving a passenger of autonomous vehicle 204 sufficient time to walk from a parking place to the restaurant and arrive on time to the scheduled appointment.

If, for example, an autonomous vehicle passenger is early to a scheduled event or appointment, parking area 202 can be increased in size to allow an embodiment of the various structures and/or processes described herein to search a larger area for more a suitable parking place such as a parking place 206 that is associated with more physical space to park, fewer restrictions, or lower parking fees. For example, upon arriving early to a baseball game, parking area 202 would be enlarged to provide a larger search area to search for a less expensive parking place 206 or a parking place 206 with fewer restrictions than sign 208. Sign 208 may also contain sign details 210 from which parking characteristic data including one or more symbols and visual characteristics (e.g., color), may be derived. Examples of sign details may include, for example, "NO PARKING 9 AM-5 PM MON-FRI." Many other options are possible for sign 208 and sign details 210. Other examples of sign details 210 can be "10 MINUTE LOADING ZONE ALL TIMES," "GUESTS ONLY," "POLICE VEHICLES ONLY," etc.

In an embodiment, autonomous vehicle 204 utilizes one or more sensors 212 to determine a permissioned parking place 206 relative to multiple classes of restricted parking. Examples of computations or logic that can be used to determine permissions for a parking place include cross-referencing databases of information related to types of parking at various locations. For instance, a central database of disabled person parking locations and their respective GPS positions may be analyzed with data received from one or more sensors 212 to confirm that a parking place is reserved for disabled persons. Examples of restricted parking may be: disabled person parking, commercial parking only, time-restricted parking, loading zone only, employee only, customer parking only, residents only, and the like. Examples of permissioned parking can be: a parking place not subject to a parking restriction, paid parking, parking lots, parking garages, reserved parking for a passenger who possesses a permission to park such as an identifying placard, sign, badge, identification card, sticker, etc. Likewise, various embodiments can employ similar technology for use on city streets, in parking garages, in parking lots, etc.

The example environment 200 of FIG. 2 illustrates an autonomous vehicle 204 driving near parked vehicle 214 and parked vehicle 216. Autonomous vehicle 204 has maneuvered to remain within parking area 202 while searching for a permissioned parking place based on determinations made by one or more computer-based systems associated with autonomous vehicle 204. Autonomous vehicle 204 may drive through parking area 202 in a pre-determined pattern to efficiently search for a permissioned place. For instance, spiral and/or expanding square search patterns, depending on which is more suited to a particular parking area 202 (e.g., downtown grid pattern vs. football stadium circular pattern), can be utilized starting with a central point located at a destination such as, e.g., a downtown restaurant and progressing outward until the closest permissioned parking place to the destination is determined. As another example, other search or path planning may be implemented, such as A* algorithms, rapidly exploring random tree ("RRT") search algorithms, etc.

Sensors 212 can be located on the main body of autonomous vehicle 204 and/or on sensor platform 218 of autonomous vehicle 204. Sensors 212 can communicate with vehicle control unit 220 to provide data such as visual recognition data. In an embodiment, sensors 212 may detect parked vehicle 214, parked vehicle 216, and empty parking place 206 between the two parked vehicles as shown in FIG. 2. Sensors 212 may use emissions such as radar, RF, laser light, etc., and/or digital photographic imaging, computer vision, and the like to determine the position and/or identities of objects relative to autonomous vehicle 204 while stationary or in motion.

Autonomous vehicle 204, using sensors 212 and/or data from a remote, networked database (not depicted), can detect sign 208 associated with empty parking place 206. GPS location data and/or visual sensor 212 data can be used to provide identification data to vehicle-parking controller 156 to determine if parking place 206 is permissioned for autonomous vehicle 204. For instance, GPS location data and/or visual sensor 212 data may confirm that a particular place is reserved for disabled persons. If vehicle 204 is not permissioned to park in disabled person parking, the determined parking place can be eliminated from the search for permissioned parking.

In an embodiment, sensors 212 detect image data related to sign details 210 that state a restriction, "NO PARKING," for a duration, "9 AM-5 PM," on certain days, "MON-FRI." Autonomous vehicle 204 can determine that based on the current day of the week and time of day, autonomous vehicle 204 may be permissioned to park in parking place 206. In an embodiment, parking place 206 is autonomously determined to be permissioned based on the current time of day and day of week (e.g., current time and day is determined to be 8:00 AM Friday, thus permissioned per sign 208), and vehicle control unit 220 initiates a command to position autonomous vehicle 204 in parking place 206.

In an embodiment, autonomous vehicle 204 can autonomously exit parking place 206 prior to expiration of a valid time to remain parked in parking place 206. For example, at 8:59 AM on a Monday, vehicle control unit 220 may initiate a command to exit parking place 206 and remain within parking area 202 in order to avoid a parking violation of sign 208 by exiting parking place 206 before 9:00 AM. While remaining in parking area 202, autonomous vehicle 204 may search for other permissioned parking within parking area 202 or may drive a pre-determined or holding route while waiting for a command from a user or fleet management system.

In an embodiment, autonomous vehicle 204 may determine with one or more sensors 212 that, based at least on sign details 210, autonomous vehicle 204 is not permissioned to park in parking place 206. Vehicle-parking controller 156 can then initiate a command to eliminate parking place 206 as a parking option and to continue to search for a permissioned parking place. One or more systems of autonomous vehicle 204 can send information regarding parking place 206 to an onboard database as well as to a remote, networked based database.

For instance, on a Saturday at 11:00 AM, autonomous vehicle 204 may approach parking place 206 and detect, with one or more sensors 212, sufficient spatial dimensions for autonomous vehicle 204 to park in parking place 206. One or more sensors 212 can further scan the area near parking place 206 to identify signs related to parking place 206 such as sign 208 in order to determine permissioned parking. Various structures and/or processes described herein may also detect and identify more than one sign related to a parking place 206.

Utilizing computer vision, digital photographic imaging, text recognition, onboard database(s) and systems, external database(s), and/or GPS location, autonomous vehicle 204 can identify one or more sign details 210 related to multiple signs to determine permissioned parking relative to multiple classes of restricted parking. Thus, based on sign details 210, Saturday at 11:00 AM would be a permissioned time to park in parking place 206. However, if a temporary additional sign (not depicted), such as a construction sign (e.g., "NO PARKING on Tuesday"), is present adjacent to parking place 206, one or more sensors 212 can detect sign details 210 to provide permission and/or restriction data related to parking place 206. Based on sign details 210 of at least one sign 208, vehicle control unit 220 will initiate a command to park autonomous vehicle 204 in parking place 206 or to initiate a command to continue to search for permissioned parking.

Autonomous vehicle 204 can utilize a vehicle control unit 220 to collect sensor data from one or more sensors 212 to analyze with data local to autonomous vehicle 204 or remotely located in a cloud or hybrid cloud environment to determine if parking place 206 is permissioned. Upon confirmation by one or more processing devices of vehicle control unit 220 that a command to park autonomous vehicle 204 should be sent, vehicle-parking controller 156 can receive a command to initiate a parking process with vehicle control unit 113. Autonomous vehicle 204 may proceed to be positioned safely into parking place 206 through use of one or more sensors 212 to ensure safe separation from other vehicles and/or hazards as autonomous vehicle 204 positions itself in parking place 206 without user intervention. A parking maneuver may be aborted if sensing platform 218 collects additional information during entry into a parking spot and detects a change in permissions (e.g., a sign announcing "No Parking" due to a festival or other event) and/or previously-unidentified physical obstacles (e.g., a passenger for a vehicle in adjacent parking spot is unloading groceries from a shopping cart). In this case, a vehicle-parking controller may generate commands to cause the vehicle to exit the parking spot, marking the location as non permissible (for general map generation for use by other vehicles), and re-plan to continue searching for an appropriate permissioned parking spot.

In an embodiment, the various structures and/or processes described herein may include detection of other parking permission indicators such as parking signs. For instance, using a color space or model, such as CYMK, RGB, etc., certain ranges of colors may be detected with a sign or marking. Colors of reflected light spectra may be received and analyzed to match against a database of colors associated with signs. Computations of image data may facilitate character recognition or symbol recognition (e.g., wheelchair symbol), with colors matching to confirm a particular sign based on matching data stored in a database of signs, sign colors, and/or other parking characteristics.

For example, painted sidewalk indicators such as red curbs to indicate no parking allowed or blue stripes or curbs for handicapped parking. Likewise, one or more sensors 212 can detect text painted on curbs such as, e.g., a green curb with white text stating "10 MINUTES ONLY." In a similar manner, one or more sensors 212 may detect portable signs placed near parking place 206. Data received from one or more data sensors 212 may be combined with external data such as from a networked or cloud/hybrid cloud-based database to factor in restrictions pertinent to parking in parking place 206 at any given time or day. In an embodiment, data used to determine permissioned parking is from autonomous vehicle 204's internal systems.

Figure 3:
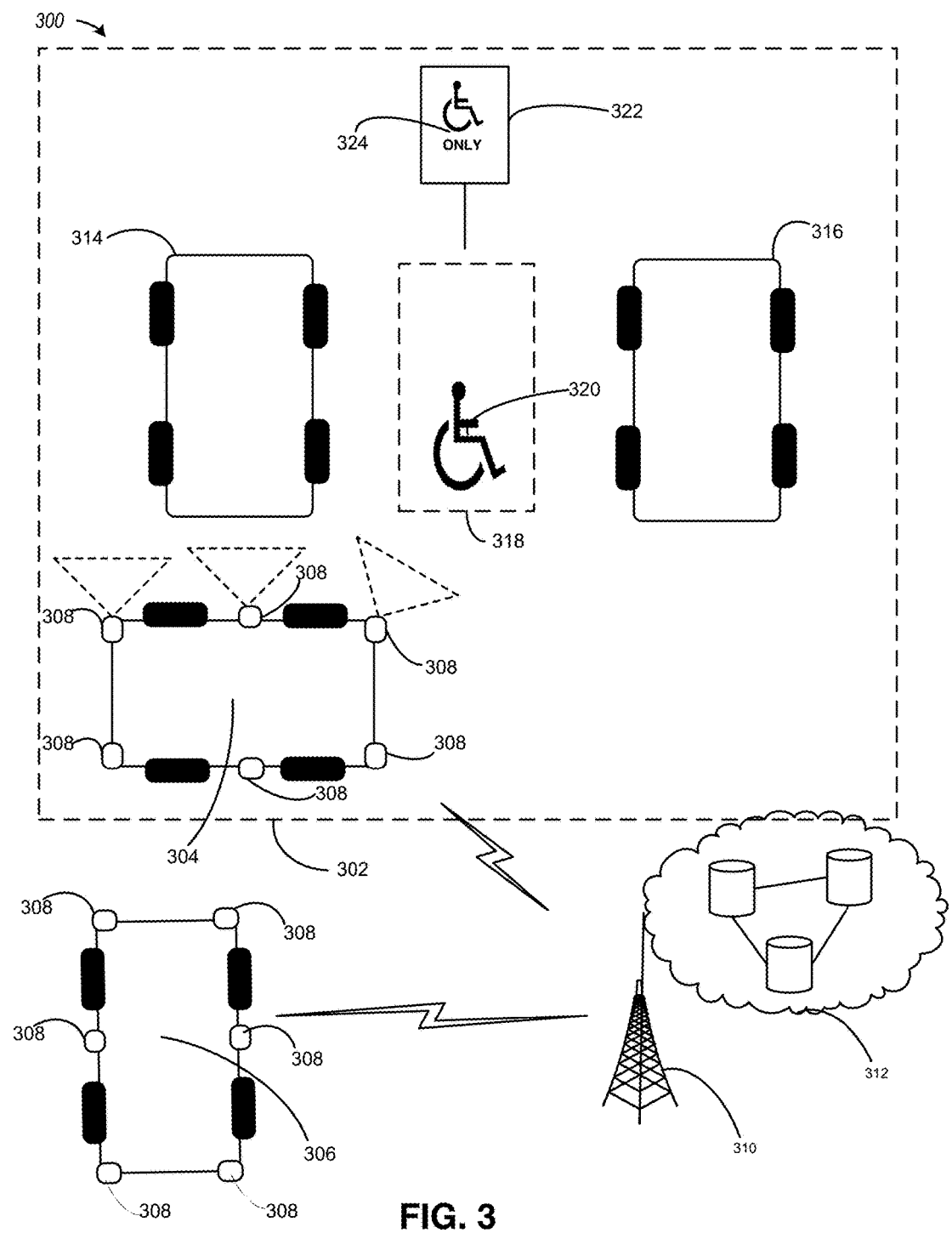
FIG. 3 illustrates an example parking environment for one or more embodiments.

FIG. 3 illustrates environment 300 including parking area 302, first vehicle 304, and second vehicle 306. In an embodiment, parking area 302 may be a parking structure such as a parking garage or a parking lot. First autonomous vehicle 304 can enter parking area 302 based on a schedule such as a personal schedule of a passenger. For example, a passenger may have an appointment near parking area 302 at noon. First autonomous vehicle 304 can arrive in parking area 302 ten minutes prior to the appointment time in order to allow for time to park and unload one or more passengers. One or more systems of first autonomous vehicle 304 can determine one or more privileges of a passenger without user intervention. For instance, facial recognition by computer vision camera(s), chip identification of an identification card via radio frequency (RF) signal, identification card reading via barcode scanner, driver database(s) to cross reference passenger parking privileges, and biometric sensing for passenger identification via eye/retinal scanner may be utilized to determine that a passenger has a disability that provides for permission to park in reserved handicapped parking place 318.

In an embodiment, parking area 302 may be reduced to search for a parking place close to a destination for the purpose of quickly identifying a parking place for disabled persons. One or more sensors 308 (e.g., lidar, radar, digital photographic imaging, computer vision, text recognition, etc.) may be utilized to identify that parking place 318 has sufficient space to park autonomous vehicle 304 between parked vehicle 314 and parked vehicle 316. Onboard and offboard location data such as GPS data may be analyzed with sensor data sensors 308 to determine a location of a parking place for disabled persons or a location associated with a restricted class of parking.

Moreover, one or more sensors 308 can determine a color and/or image 320 associated with parking place 318. This data, along with parking data detected from sign 322 with sign details 324, facilitate determination of a classification of parking place 318. Numerous classifications may be determined for parking places, such as restricted parking, loading zone, occupied parking, unoccupied parking, expectant mother parking, temporarily restricted parking, commercial vehicle parking, police parking, ambulance parking, etc. Any factor used to differentiate one parking place from another can be used for classification in order to provide real-time or near real-time data regarding parking places.

For example, parking place 318 with a blue wheelchair symbol 320, in addition to a blue wheelchair symbol 324 on sign 322, facilitate classification of parking place 318 as a handicapped parking place. Consequently, first autonomous vehicle 304 may determine that parking place 318 is permissioned for first autonomous vehicle 304 because a passenger of first autonomous vehicle 304 is disabled. If no other restrictions exist such as other signs, colors, text, etc. that indicate parking restrictions, one or more systems of first autonomous vehicle 304 may initiate a command to park first autonomous vehicle 304 in parking place 318.

In an embodiment, first autonomous vehicle 304 is deemed not permissioned to park in parking place 318 because it does not have a handicapped passenger and/or does not have a handicapped identifier such as an identifying placard, license, card, etc. Thus, one or more systems of first autonomous vehicle 304 can classify parking place 318 as restricted and unavailable for first autonomous vehicle 304. One or more systems of first autonomous vehicle 304 may send real-time parking place classification data to an external system such as a networked or cloud-based database 312 for the purpose of updating a centralized parking application. In an embodiment, first autonomous vehicle 304 can utilize data transmission tower 310 to communicate with cloud-based database 312. Besides transmission tower 310, other forms of data transfer may be used by the various structures and/or processes described herein. For instance, WI-FI, BLUETOOTH, SMS, email, etc. may be utilized for data transfer without requiring data transmission tower 310.

Figure 4:
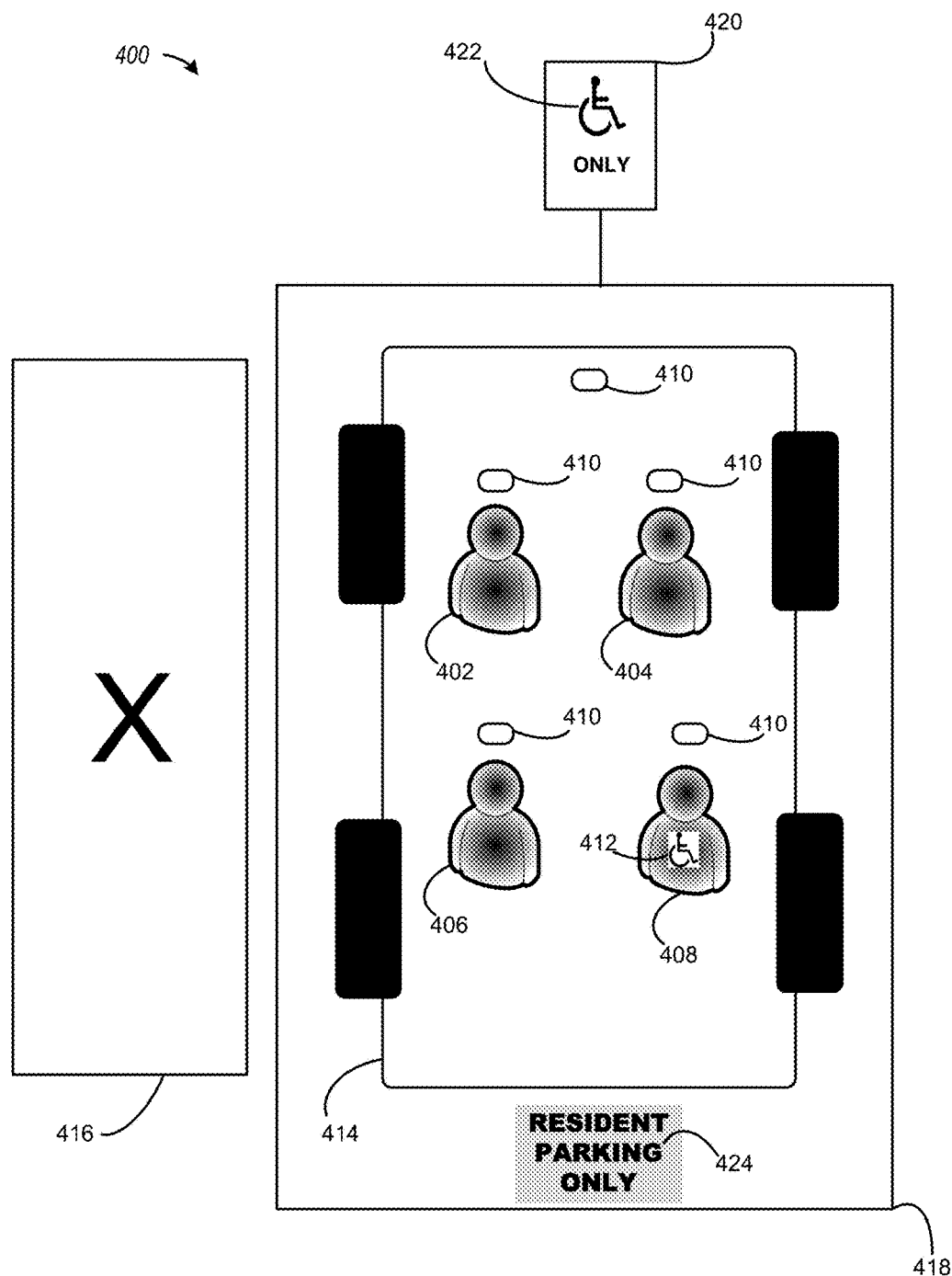
FIG. 4 illustrates an example parking environment for one or more embodiments.

FIG. 4 illustrates an example parking environment 400 that may vary depending on a status of one or more passengers 402-408 of autonomous vehicle 414. Passenger 408 may be classified, using one or more sensors 410, as a disabled person due to one or more detected disability indicators 412 such as, for example, body recognition, biometric sensor analysis, facial recognition, voice recognition, audible command, text command, identification card, visible symbol, etc. Passenger 408 can also have a disabled passenger status applied based on data received from an internal or external application and/or database.

Examples of external applications may include cloud or hybrid cloud-based map application that tracks the status of parking places in real time and sends updated parking status data to one or more vehicles. In an embodiment, an external identification/permission application can analyze passenger identification data submitted by one or more vehicles to determine associated parking permissions and send related data to one or more vehicles to facilitate vehicle parking in parking places with multiple classes of restricted parking.

Generation of external application map data in real time may occur in conjunction with data sensor updates of one or more autonomous vehicles providing sensor data to the external map application, in real time, as the one or more autonomous vehicles are collecting sensor data, whether in motion or stationary. For example, sensor data can be transmitted to a networked computing system such as the external map application for updating in an aggregated manner over a number of vehicles.

In an embodiment, a granular level of map data for a parking garage can be generated in real time. Thus, an autonomous vehicle exiting the parking garage ten minutes prior to a second autonomous vehicle arriving, will pass numerous parking places as it travels from the fifth floor level to the street level. If the second autonomous vehicle is searching for a particular parking place, updated map data may be downloaded to the second autonomous vehicle to present possible open spaces on the third level, for example, or a particular permission-restricted space (e.g., valet parking).

Parking environment 400 can occur on a street, parking lot, parking garage, etc. In an embodiment, obstruction 416 may be located adjacent to parking place 418. One or more systems of autonomous vehicle 414 can determine that disabled passenger 408 requires an amount of space to accommodate disabled passenger 408 when exiting autonomous vehicle 414 at a particular side or door. Moreover, based at least on this determination, one or more systems of autonomous vehicle 414 may initiate a command to a vehicle control unit 113 (of FIG. 1) to position autonomous vehicle 414 with either the front of the vehicle facing sign 420 or with the rear of autonomous vehicle 414 facing sign 420. Whichever positioning provides space for disabled passenger 408 to exit, such as depicted in FIG. 4, autonomous vehicle 414 may function to position disabled passenger 408 from obstruction 416, thereby providing more space for passenger 408 to exit autonomous vehicle 414 while utilizing, for example, a wheelchair, mobility device, etc.

In an embodiment, one or more signs 420 may display various symbols 422 to indicate a classification of parking place 418. For instance, one or more symbols 422 may indicate handicapped parking, reserved parking, resident parking, police/emergency vehicle parking, pregnant woman parking, family parking, member parking, etc. Furthermore, various colors, patterns, and symbols may be detected on the ground such as, for example, blue or shaded parking spaces and white lines for the purpose of parking classification.

An example embodiment may include a "RESIDENT PARKING ONLY" indication 424 on the ground of parking place 418 and/or handicapped symbol 422 displayed on sign 420. One or more sensors 410 can detect the "RESIDENT PARKING ONLY" indication 424 and handicapped symbol 422 and send related data to one or more systems of autonomous vehicle 414 for determination of permission to park in reserved parking place 418. Internal and/or external databases may be accessed to confirm permission to park in reserved parking place 418. For instance, passenger 402 may be a resident with permission to park in reserved parking place 418. One or more sensors 410 of autonomous vehicle 412 can send identifying data of passenger 402 to one or more systems of autonomous vehicle 412 for determination of permissions associated with passenger 402. Upon determining that passenger 402 is a resident with permission to park in "RESIDENT PARKING ONLY"-classified parking spaces (through use of, e.g., identification card reader/scanner), in addition to determination that at least one passenger 412 has permission to park in disabled person parking (through verification of, e.g., RF signal in identification card chip), one or more systems of autonomous vehicle 414 can initiate a command to position autonomous vehicle 414 in parking place 418 in a manner which facilitates easier exit for disabled passenger 408.

Figure 5:
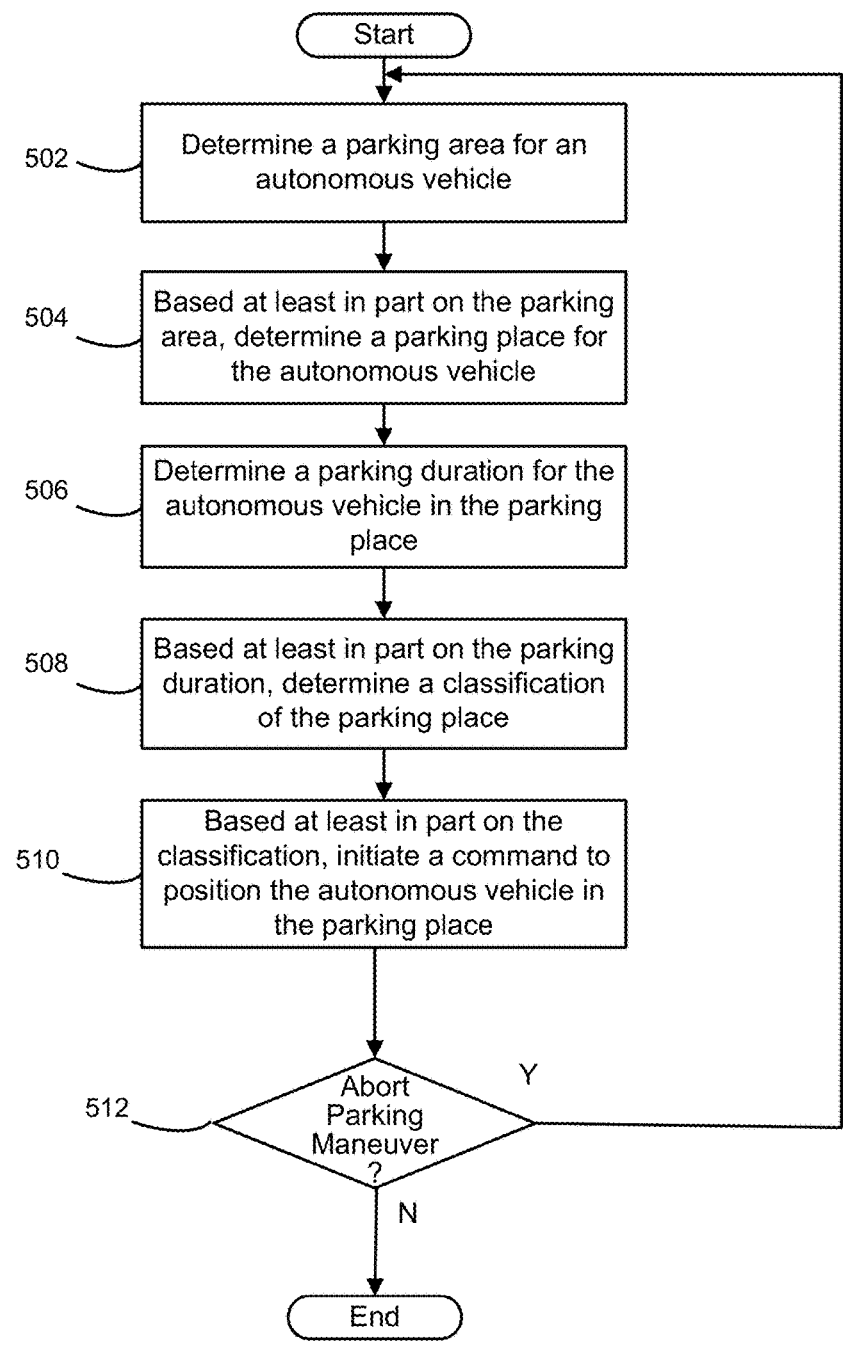
FIG. 5 illustrates an example process that can be used in one or more embodiments.

FIG. 5 illustrates an example process that can be used in one or more embodiments. Example process 500 can begin with 502 determining a parking area for an autonomous vehicle. This may include searching for a parking garage, parking structure, parking lot, or general area with parking spaces. Process 500 may continue to 504 determine, based at least in part on the parking area, a parking place for the autonomous vehicle. This may be performed by determining one or more classifications of available parking such as, for instance, disabled parking, reserved parking, restricted parking, etc.

Example process 500 can continue to 506 determine a parking duration for the autonomous vehicle in the parking place. One or more systems of an autonomous vehicle may determine parking duration by, for example, analyzing parking sign/symbol data in addition to a related personal calendar of a passenger, a permission related to a passenger, a disability related to a passenger, a day of the week, and a time of day. Analysis of these factors facilitate autonomous initiation of positioning into a parking place or continuing on a search for permissioned parking.

Moreover, example process 500 may continue to 508 determine a classification of the parking place. Classification may be determined by sensor analysis of parking signs, symbols, colors, etc. combined with onboard computer processing or cloud-based processing of related data to determine permissioned parking status of one or more parking places. Once permissioned parking status is determined for one or more parking places, process 500 can continue to 510 initiate a command to position the autonomous vehicle in the parking place based at least in part on the classification. At 512, a determination is made as to whether a change in a status of a detected parking spot may be detected (e.g., detecting a change in permissions). In the event a parking maneuver is aborted at 512, flow 500 may continue back to 502 to determine an appropriate parking place.

Figure 6:
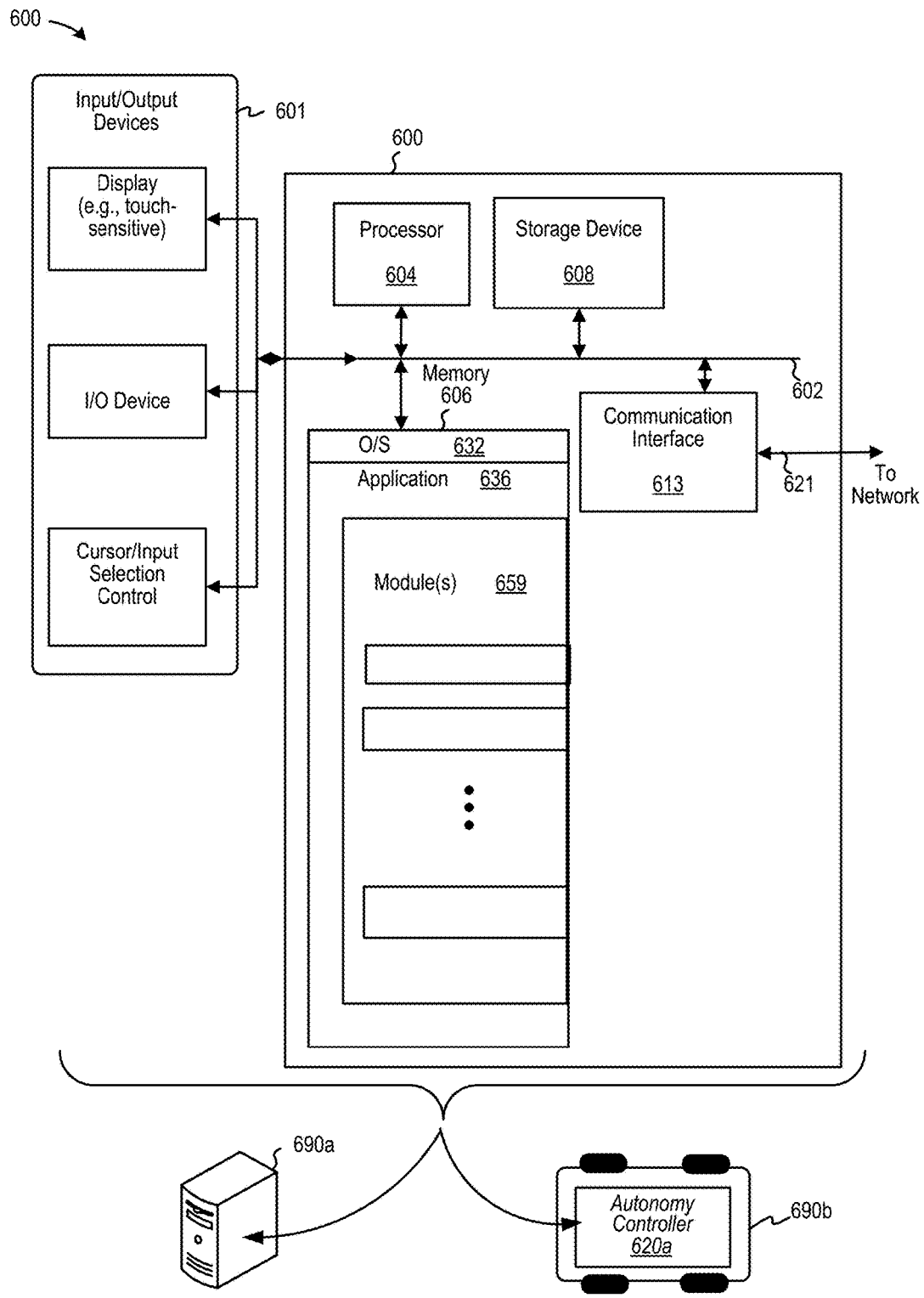
FIG. 6 illustrates examples of various computing platforms configured to provide various functionalities to components of an autonomy controller, according to various embodiments.

FIG. 6 illustrates examples of various computing platforms configured to provide various functionalities to components of an autonomy controller that can be associated with various embodiments of the various structures and/or processes described herein. In some examples, computing platform 600 may be used to implement computer programs, applications, methods, processes, algorithms, or other software, as well as any hardware implementation thereof, to perform the above-described techniques.

In some cases, computing platform 600 or any portion (e.g., any structural or functional portion) can be disposed in any device, such as a computing device 690a, autonomous vehicle 690b, and/or a processing circuit in forming structures and/or functions of an autonomy controller 620a, according to various examples described herein.

Computing platform 600 includes a bus 602 or other communication mechanism for communicating information, which interconnects subsystems and devices, such as processor 604, system memory 606 (e.g., RAM, etc.), storage device 608 (e.g., ROM, etc.), an in-memory cache (which may be implemented in memory 606 or other portions of computing platform 600), a communication interface 613 (e.g., an Ethernet or wireless controller, a BLUETOOTH controller, NFC logic, etc.) to facilitate communications via a port on communication link 621 to communicate, for example, with a computing device, including mobile computing and/or communication devices with processors, including database devices (e.g., storage devices configured to store atomized datasets, including, but not limited to triplestores, etc.). Processor 604 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 600 exchanges data representing inputs and outputs via input-and-output devices 601, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 601 may be implemented as, or otherwise substituted with, a user interface in a computing device associated with a user account identifier in accordance with the various examples described herein.

According to some examples, computing platform 600 performs specific operations by processor 604 executing one or more sequences of one or more instructions stored in system memory 606, and computing platform 600 can be implemented in a client-server arrangement, peer-to-peer arrangement, or as any mobile computing device, including smart phones, tablets, laptops, and the like. Such instructions or data may be read into system memory 606 from another computer readable medium, such as storage device 608. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks and the like. Volatile media includes dynamic memory, such as system memory 606.

Known forms of computer readable media include, for example, floppy disk, flexible disk, hard disk, magnetic tape, any other magnetic medium, CD-ROM, any other optical medium, punch cards, paper tape (e.g., or patterns of holes), any other physical medium, such as RAM, PROM, EPROM, FLASH-EPROM devices, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 602 for transmitting a computer data signal.

In some examples, execution of the sequences of instructions may be performed by computing platform 600. According to some examples, computing platform 600 can be coupled by communication link 621 (e.g., a wired network, such as LAN, PSTN, or any wireless network, cloud-based network, including Wi-Fi of various standards and protocols, Bluetooth®, NFC, Zig-Bee, etc.) to any other processor to perform the sequence of instructions in coordination with (or asynchronous to) one another. Computing platform 600 may transmit and receive messages, data, and instructions, including program code (e.g., application code) through communication link 621 and communication interface 613. Received program code may be executed by processor 604 as it is received, and/or stored in memory 606 or other non-volatile storage for later execution.

In the example shown, system memory 606 can include various modules that include executable instructions to implement functionalities described herein. System memory 606 may include an operating system ("O/S") 632, as well as an application 636 and/or logic module(s) 659. In the example shown in FIG. 6, system memory 606 may include any number of modules 659, any of which, or one or more portions of which, can be configured to facilitate any one or more components of a computing system (e.g., a client computing system, a server computing system, a cloud-based computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques, including, but not limited to, FORTH, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, Javascript™ Ajax, Perl, Python™, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement at least one of the described techniques or variations thereof. Database management systems (i.e., "DBMS"), search facilities and platforms, web crawlers (i.e., computer programs that automatically or semi-automatically visit, index, archive or copy content from, various websites (hereafter referred to as "crawlers")), and other features may be implemented using various types of proprietary or open source technologies, including MySQL, Oracle (from Oracle of Redwood Shores, Calif.), Solr and Nutch from The Apache Software Foundation of Forest Hill, Md., among others and without limitation. The described techniques may be varied and are not limited to the examples or descriptions provided. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 659 of FIG. 6, or one or more of their components, or any process or device described herein, can be in communication (e.g., wired or wirelessly) with a mobile device, such as a mobile smartphone, mobile tablet, mobile computing device, or can be disposed therein.

The computing device may be disposed in autonomous vehicle 690b as autonomy controller 620a. In some cases, a mobile device, or any networked computing device (not shown) in communication with one or more modules 659 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof.

Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 659 or one or more of its/their components, or any process or device described herein, can be implemented in one or more computing devices (i.e., any mobile computing device) that may include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 659 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit).

According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Embodiments of the various structures and/or processes described herein improve functionality of computer hardware systems such as processors, central processing units, etc. by providing efficient utilization of computer processing cycles to perform desired actions. The improved efficiency can result in fewer computer processing cycles and increased processor lifespan. Likewise, increased processor lifespan may result in an increase in the lifespan of associated hardware as found in, for example, a computing system.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   determining a parking area for an autonomous vehicle;
   based at least in part on the parking area, determining a parking place for the autonomous vehicle comprising capturing an image of a parking place sign;
   determining a parking duration for the autonomous vehicle in the parking place;
   based at least in part on the parking duration and on the image, determining a classification of the parking place; and
   based at least in part on the classification, initiating a command to position the autonomous vehicle in the parking place.

2. The method of claim 1, wherein the image of the parking place sign is captured using at least one image sensor of the autonomous vehicle.

3. The method of claim 1, wherein determining the parking place for the autonomous vehicle is based at least in part on analyzing location data related to the parking place.

4. The method of claim 3, wherein the location data is captured using at least one location device of the autonomous vehicle.

5. The method of claim 1, wherein determining the classification of the parking place is based at least in part on:
   receiving data related to the parking place from at least one sensor of the autonomous vehicle;
   sending the data related to the parking place to an external application;

updating the external application with the data related to the parking place;

receiving additional data related to the parking place from the updated external application; and analyzing the additional data related to the parking place.

6. The method of claim 5, wherein the additional data related to the parking place is a permission to park the autonomous vehicle in the parking place.

7. The method of claim 1, wherein initiating the command to position the autonomous vehicle in the parking place is based at least in part on:

receiving identification data related to a passenger from a sensor of the autonomous vehicle;

sending the identification data related to the passenger to an external application;

based at least in part on the identification data related to the passenger, receiving parking data related to the passenger from the external application; and analyzing the parking data related to the passenger.

8. The method of claim 7, wherein the parking data related to the passenger is a permission to park in the parking place.

9. The method of claim 1, wherein initiating the command to position the autonomous vehicle in the parking place is based at least in part on:

determining a charge state of the autonomous vehicle; and determining a location of a charging station.

10. The method of claim 1, wherein determining the parking place for the autonomous vehicle is based at least part on identifying a passenger of the autonomous vehicle and wherein the method further comprises:

analyzing scheduling data related to the passenger; and coordinating position of the autonomous vehicle with the scheduling data.

11. A method, comprising:

determining a parking area for an autonomous vehicle;

based at least in part on the parking area, determining a parking place for the autonomous vehicle, wherein determining the parking place for the autonomous vehicle is based at least in part on identifying a passenger of the autonomous vehicle, wherein the passenger is identified as requiring a parking space for disabled persons;

determining a parking duration for the autonomous vehicle in the parking place;

based at least in part on the parking duration, determining a classification of the parking place; and based at least in part on the classification, initiating a command to position the autonomous vehicle in the parking place, wherein the command to position the autonomous vehicle in the parking place comprises positioning the autonomous vehicle to provide a maximum exit area for the passenger identified as requiring the parking space for disabled persons.

12. The method of claim 11, wherein identifying the passenger of the autonomous vehicle is based on a facial recognition of the passenger.

13. The method of claim 11, wherein identifying the passenger of the autonomous vehicle is based on biometric sensing of the passenger.

14. An apparatus, comprising:

a memory including executable instructions; and a processor, responsive to executing the instructions, the processor configured to:

determine a parking area for an autonomous vehicle;

based at least in part on the parking area, determine a parking place for the autonomous vehicle comprising capturing an image of a parking place sign;

determine a parking duration for the autonomous vehicle in the parking place;

based at least in part on the parking duration and on the image, determine a classification of the parking place; and based at least in part on the classification, initiate a command to position the autonomous vehicle in the parking place.

15. The apparatus of claim 14, wherein determining the parking duration for the autonomous vehicle comprises analyzing scheduling data of a passenger.

16. The apparatus of claim 14, further comprising:

at least one image sensor, and wherein the image of the parking place sign is captured using the at least one image sensor.

17. The apparatus of claim 14, wherein determining the parking space for the autonomous vehicle is based at least in part on identifying a passenger of the autonomous vehicle.

18. The apparatus of claim 14, wherein initiating the command to position the autonomous vehicle in the parking place is based at least in part on:

determining a charge state of the autonomous vehicle; and determining a location of a charging station.

19. The apparatus of claim 14, further comprising:

at least one location device that captures location data related to the parking place.

20. The apparatus of claim 19, wherein determining the parking place for the autonomous vehicle is based at least in part on analyzing the location data related to the parking place.

* * * * *